(12) United States Patent
Hatada et al.

(10) Patent No.: US 11,301,620 B2
(45) Date of Patent: Apr. 12, 2022

(54) ANNOTATION DISPLAY METHOD AND TERMINAL

(71) Applicant: FUJITSU LIMITED, Kawasaki (JP)

(72) Inventors: Koki Hatada, Kawasaki (JP); Keiju Okabayashi, Sagamihara (JP)

(73) Assignee: FUJITSU LIMITED, Kawasaki (JP)

( * ) Notice: Subject to any disclaimer, the term of this patent is extended or adjusted under 35 U.S.C. 154(b) by 0 days.

(21) Appl. No.: 17/325,255

(22) Filed: May 20, 2021

(65) Prior Publication Data

US 2022/0012412 A1 Jan. 13, 2022

(30) Foreign Application Priority Data

Jul. 13, 2020 (JP) .............................. JP2020-120218

(51) Int. Cl.
*G06F 3/0481* (2022.01)
*G06F 40/169* (2020.01)
*G06F 3/0484* (2022.01)
*G06F 16/438* (2019.01)
(Continued)

(52) U.S. Cl.
CPC .......... *G06F 40/169* (2020.01); *G06F 3/0481* (2013.01); *G06F 3/1454* (2013.01); *G06F 16/4393* (2019.01); *G06F 16/489* (2019.01)

(58) Field of Classification Search
None
See application file for complete search history.

(56) References Cited

U.S. PATENT DOCUMENTS

| 5,884,263 A | * | 3/1999 | Aaron | ..................... G10L 25/48 704/270 |
| 7,028,267 B1 | * | 4/2006 | Beezer | .................. G06F 40/169 715/802 |

(Continued)

FOREIGN PATENT DOCUMENTS

| EP | 3742280 A1 | 11/2020 |
| JP | 2006-004298 A | 1/2006 |

(Continued)

OTHER PUBLICATIONS

Extended European Search Report dated Nov. 16, 2021 for corresponding European Patent Application No. 21176198.6, 11 pages.

*Primary Examiner* — Jordany Nunez
(74) *Attorney, Agent, or Firm* — Fujitsu Patent Center

(57) ABSTRACT

A non-transitory computer-readable recording medium has stored therein a program that causes a computer to execute a process including determining, in response to detection of switching of displayed image data, whether a first annotation is added to first image data which is displayed before the switching, storing the first annotation in a storage in association with the first image data in a case where it is determined that the first annotation is added to the first image data, determining whether first specific image data exists in the storage, the first specific image data satisfying a condition with respect to second image data which is displayed after the switching, and superimposing, in a case where it is determined that the first specific image data exists, a second annotation stored in the storage in association with the first specific image data on the second image data to display the second annotation.

8 Claims, 18 Drawing Sheets

(51) Int. Cl.
  *G06F 16/48* (2019.01)
  *G06F 3/14* (2006.01)

(56) References Cited

U.S. PATENT DOCUMENTS

| | | | | |
|---|---|---|---|---|
| 7,383,505 B2* | 6/2008 | Shimizu | | G06F 40/169 715/230 |
| 7,568,168 B2* | 7/2009 | Beezer | | G06F 40/169 715/802 |
| 8,548,449 B2* | 10/2013 | Axelrod | | H04M 1/56 455/415 |
| 8,555,198 B2* | 10/2013 | Beezer | | G06F 40/169 715/802 |
| 8,880,597 B1* | 11/2014 | Pachikov | | G06Q 10/107 709/204 |
| 9,171,132 B1* | 10/2015 | Pachikov | | G06Q 10/107 |
| 10,088,513 B2* | 10/2018 | Kitajima | | G01R 29/18 |
| 10,887,338 B2* | 1/2021 | Miller | | G06F 21/629 |
| 2005/0223315 A1* | 10/2005 | Shimizu | | G06F 40/169 715/230 |
| 2006/0010396 A1* | 1/2006 | Beezer | | G06F 40/169 715/802 |
| 2006/0048047 A1* | 3/2006 | Tao | | G06F 40/169 715/232 |
| 2008/0147677 A1* | 6/2008 | Nishino | | G06F 16/958 |
| 2008/0147841 A1* | 6/2008 | Nishino | | H04L 67/02 709/223 |
| 2011/0287810 A1* | 11/2011 | Zelber | | H04M 1/575 455/566 |
| 2013/0016058 A1 | 1/2013 | Yamamoto | | |
| 2013/0031453 A1* | 1/2013 | Griffiths | | G06F 40/169 715/230 |
| 2013/0031457 A1* | 1/2013 | Griffiths | | G06F 40/169 715/231 |
| 2013/0212463 A1* | 8/2013 | Pachikov | | G06F 40/10 715/234 |
| 2014/0267440 A1 | 9/2014 | Tsukuda | | |
| 2015/0178260 A1* | 6/2015 | Brunson | | G06F 40/169 715/202 |
| 2017/0134364 A1* | 5/2017 | Chen | | G06F 16/93 |
| 2017/0171239 A1* | 6/2017 | Miller | | H04W 12/122 |
| 2018/0059889 A1* | 3/2018 | Taniguchi | | G06F 3/0481 |
| 2018/0165255 A1* | 6/2018 | Gafford | | G06F 40/174 |
| 2019/0294587 A1* | 9/2019 | Prakash | | G06F 3/0482 |

FOREIGN PATENT DOCUMENTS

| | | |
|---|---|---|
| JP | 2007-058677 A | 3/2007 |
| JP | 2017-054192 A | 3/2017 |
| WO | 2019/140997 A1 | 7/2019 |

\* cited by examiner

FIG. 9

| IMAGE ID | IMAGE DATA | REGISTRATION TIME | UPDATE TIME |
|---|---|---|---|
| 1 | PD1 | 04/28/2020 10:10:00 | ... |
| 2 | PD2 | 04/28/2020 10:11:30 | ... |
| 3 | PD3 | 04/28/2020 10:12:30 | ... |
| 4 | PD4 | 04/28/2020 10:13:30 | ... |
| 5 | PD5 | 04/28/2020 10:15:30 | ... |

220

900

ANNOTATION DISPLAY METHOD AND TERMINAL

CROSS-REFERENCE TO RELATED APPLICATION

This application is based upon and claims the benefit of priority of the prior Japanese Patent Application No. 2020-120218, filed on Jul. 13, 2020, the entire contents of which are incorporated herein by reference.

FIELD

The embodiments discussed herein are related to an annotation display method and a terminal.

BACKGROUND

Typically, there has been a system that captures a screen of a terminal and transmits the captured screen to a large screen display so as to display a video. For example, a user may add a handwritten stroke, a sticky note, or the like as an annotation on the video displayed on the large screen display.

As related art, for example, there has been a technique for controlling display of a comment on content in response to switching of the content on the basis of content data including a plurality of pieces of content that is switched in response to an operation and comment data indicating a comment of a viewer on the content.

Japanese Laid-open Patent Publication No. 2017-54192 is disclosed as related art.

SUMMARY

According to an aspect of the embodiments, a non-transitory computer-readable recording medium has stored therein a program that causes a computer to execute a process, the process including determining, in response to detection of switching of displayed image data, whether a first annotation is added to first image data which is displayed before the switching, storing the first annotation in a storage in association with the first image data in a case where it is determined that the first annotation is added to the first image data, determining whether first specific image data exists in the storage, the first specific image data satisfying a condition with respect to second image data which is displayed after the switching, and superimposing, in a case where it is determined that the first specific image data exists, a second annotation stored in the storage in association with the first specific image data on the second image data to display the second annotation.

The object and advantages of the invention will be realized and attained by means of the elements and combinations particularly pointed out in the claims.

It is to be understood that both the foregoing general description and the following detailed description are exemplary and explanatory and are not restrictive of the invention.

BRIEF DESCRIPTION OF DRAWINGS

FIG. 3 is a block diagram illustrating an exemplary hardware configuration of a first information processing terminal 201 or the like;

FIG. 9 is an explanatory diagram (No. 2) illustrating the search order of the similar image data;

DESCRIPTION OF EMBODIMENTS

In related art, there has been a problem in that, when the displayed image is switched in a case where an image displayed on a terminal is transmitted and is displayed on another terminal, it is not possible to display an annotation added to the image in the past on the image after switching.

Hereinafter, embodiments will be described in detail with reference to the drawings.

First Embodiment

Figure 1:
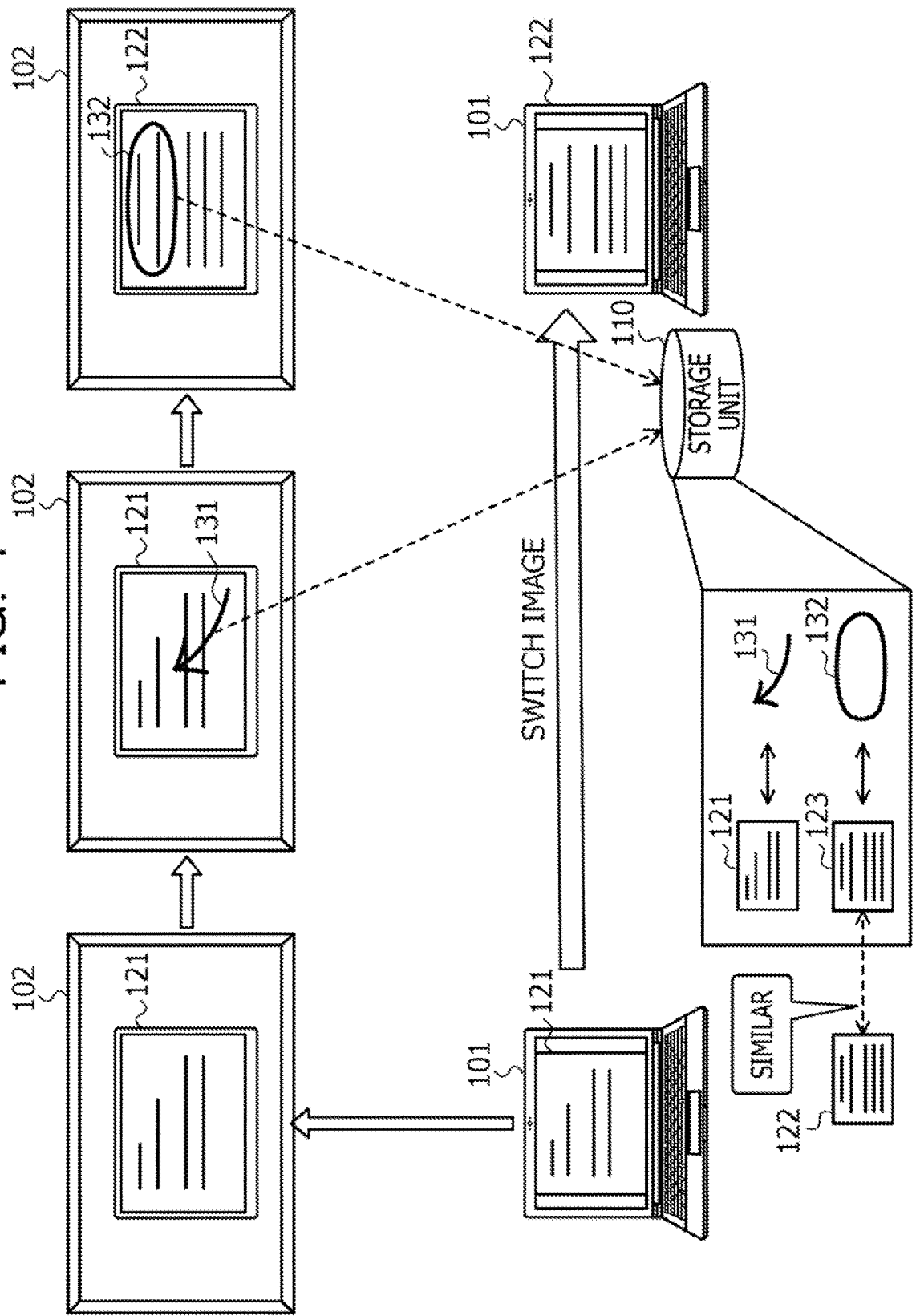
FIG. 1 is an explanatory diagram illustrating an embodiment of an annotation display method according to a first embodiment.

FIG. 1 is an explanatory diagram illustrating an example of an annotation display method according to a first embodiment. In FIG. 1, a first device 101 is a computer that transmits image data to be displayed. A second device 102 is a computer that displays the image data received from the first device 101. The image data to be displayed is, for example, image data obtained by capturing a video displayed on the first device 101.

The first device 101 is, for example, a mobile terminal such as a Personal Computer (PC), a tablet terminal, or a smartphone. The second device 102 is, for example, a display device having a large screen display, a projection device that displays (projects) an image on a screen or the like, or the like.

With the second device 102, a plurality of users may share the screen of the first device 101 and may communicate with each other. Furthermore, with the second device 102, the user may add annotations on the displayed image data through an input with a pen or with a gesture interface or the like.

The annotation is an object superimposed and displayed on the image data. The annotation is added, for example, in a case where a point to be focused on in the image data is indicated, association between pieces of information in the image data is indicated, and information is supplemented to the image data. The annotation includes a handwritten stroke, a sticky note, a stamp image, or the like created by a user according to the image data.

Here, in a case where image data displayed on a certain terminal is transmitted to and is displayed on another terminal, when the displayed image data is switched and a correspondence relationship between the image data and an annotation is lost, it is not possible to automatically display the annotation added to the image data in the past on the image data after switching.

On the other hand, at the time of switching the displayed image data, when a user manually deletes the annotation added to the image data before switching or adds the annotation to the image data after switching again, this takes time and labor, and thus there is a concern that a work efficiency is reduced.

Therefore, in the first embodiment, an annotation display method will be described that may redisplay an annotation added to image data in the past in a case where the image data is displayed. Hereinafter, a processing example of the first device 101 will be described.

(1) The first device 101 determines whether or not an annotation is added to first image data before switching in response to detection of switching of displayed image data. In a case of determining that the annotation is added to the first image data, the first device 101 stores the annotation in a storage unit 110 in association with the first image data.

In the example in FIG. 1, a case is assumed where image data 121 displayed on the first device 101 is transmitted from the first device 101 to the second device 102 and is displayed on the second device 102. The image data 121 is information obtained by capturing a screen of the first device 101. With the second device 102, for example, a plurality of persons may share the screen (image data 121) of the first device 101 and may communicate with each other. Furthermore, the second device 102 may add an annotation on the displayed image data 121.

Here, a case is assumed where an annotation 131 is added to the image data 121 displayed on the second device 102. The annotation 131 is a stroke indicating a portion to be focused on in the image data 121. Furthermore, a case is assumed where the image data 121 is switched to image data 122 after the annotation 131 is added on the image data 121.

In this case, the first device 101 determines whether or not an annotation is added to the image data 121 before switching. For example, in a case where the annotation 131 added to the image data 121 is acquired from the second device 102, the first device 101 may determine that the annotation 131 is added to the image data 121. Here, the first device 101 determines that the annotation 131 is added to the first image data 121 and stores the annotation 131 in the storage unit 110 in association with the first image data 121.

(2) The first device 101 determines whether or not image data similar to second image data after switching exists in the storage unit 110. In a case of determining that the similar image data exists, the first device 101 superimposes and displays an annotation stored in the storage unit 110 in association with the similar image data on the second image data.

For example, the first device 101 searches for image data similar to the image data 122 after switching from the image data stored in the storage unit 110. Specifically, for example, the first device 101 compares the image data 122 after switching with the image data stored in the storage unit 110 and calculates a similarity between the pieces of image data. Then, in a case where image data of which the calculated similarity is equal to or more than a threshold is searched, the first device 101 determines that the similar image data exists.

Note that, as a technique for searching for the similar image data, any existing technique may be used. For example, the first device 101 may search for the similar image data on the basis of a feature amount of image data.

Here, a case is assumed where image data 123 similar to the image data 122 after switching is searched. Furthermore, a case is assumed where an annotation 132 is stored in the storage unit 110 in association with the image data 123. In this case, the first device 101 superimposes and displays the annotation 132, stored in the storage unit 110 in association with the image data 123, on the image data 122. Specifically, for example, the first device 101 transmits the annotation 132 to the second device 102 and superimposes and displays the annotation 132 on the image data 122 displayed on the second device 102.

In this way, according to the first device 101, when image data is displayed, it is possible to redisplay an annotation added to the image data in the past. Therefore, there is no need for a user to perform a troublesome work for manually re-adding the annotation to the image data after switching at the time of switching the displayed image data, and a work efficiency may be improved.

In the example in FIG. 1, when the image data 121 is switched to the image data 122, the annotation 132 added to the image data 122 (image data 123 similar to image data 122) in the past may be redisplayed. Therefore, there is no need for the user to perform the troublesome work for manually re-adding the annotation to the image data 122 after switching.

(Exemplary System Configuration of Display System 200)

Next, an exemplary system configuration of a display system 200 according to the first embodiment will be described. The display system 200 is applied to, for example, a computer system that enables information sharing by a plurality of persons and assists collaborative work by transmitting image data displayed on a PC or the like and displaying the image data on a large screen display.

Figure 2:
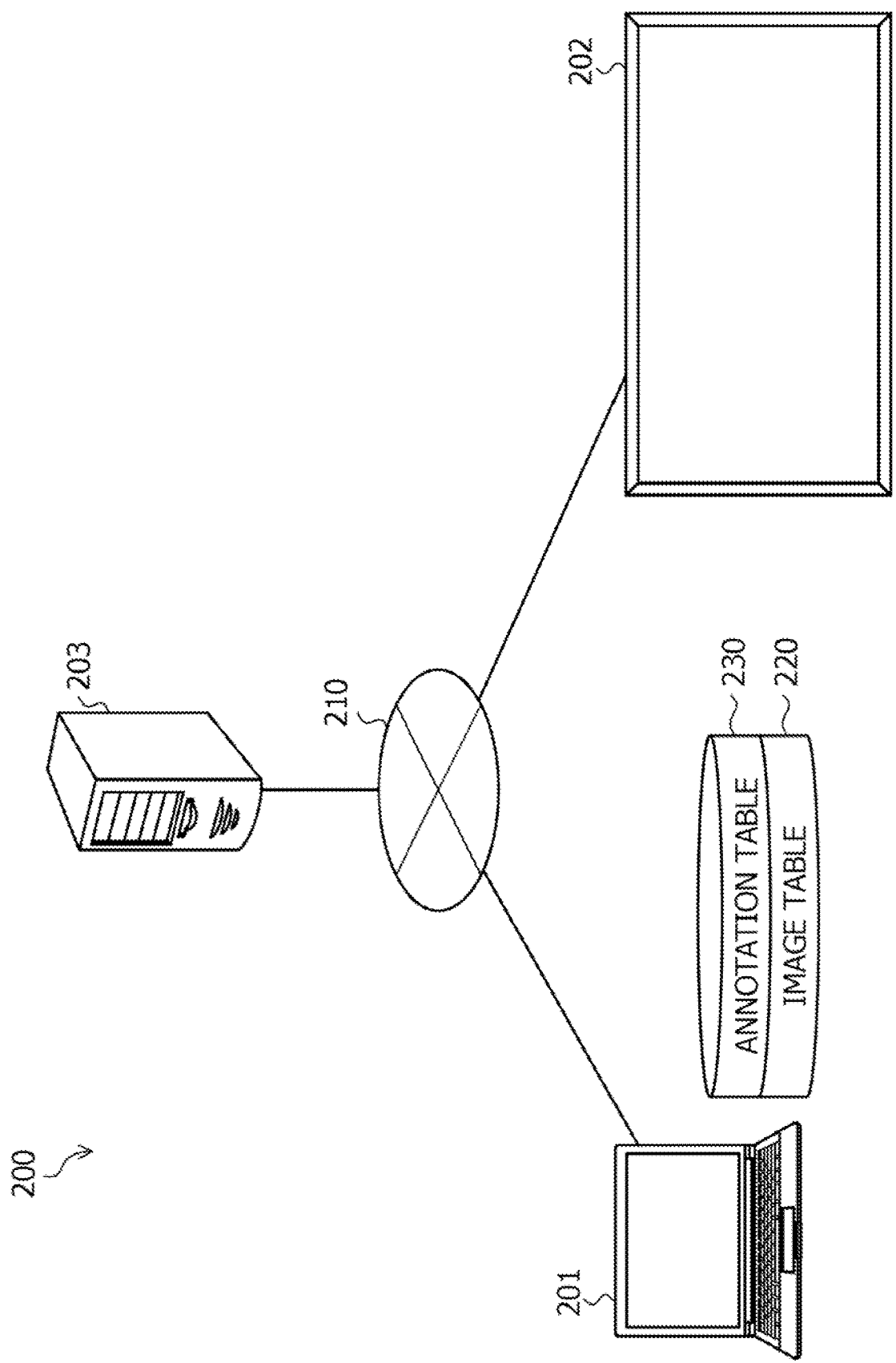
FIG. 2 is an explanatory diagram illustrating an exemplary system configuration of a display system 200.

FIG. 2 is an explanatory diagram illustrating an exemplary system configuration of the display system 200. In FIG. 2, the display system 200 includes a first information processing terminal 201, a second information processing terminal 202, and an information management server 203. In the display system 200, the first information processing terminal 201, the second information processing terminal 202, and the information management server 203 are connected via a wired or wireless network 210. The network 210 is, for example, a Local Area Network (LAN), a Wide Area Network (WAN), the Internet, or the like.

Here, the first information processing terminal 201 includes an image table 220 and an annotation table 230. The first information processing terminal 201 is, for example, a PC or a tablet PC used by an individual. Content stored in the image table 220 and the annotation table 230 will be described later with reference to FIGS. 4 and 5. The first device 101 illustrated in FIG. 1 corresponds to, for example, the first information processing terminal 201. Furthermore, the storage unit 110 illustrated in FIG. 1 corresponds to, for example, the image table 220 and the annotation table 230.

The second information processing terminal 202 is, for example, a display device having a large screen display. The second device 102 illustrated in FIG. 1 corresponds to, for example, the second information processing terminal 202.

The information management server 203 is a computer that manages various types of information. Specifically, for example, the information management server 203 manages applications used by the first information processing terminal 201 and the second information processing terminal 202, information displayed on the first information processing terminal 201 and the second information processing terminal 202, or the like.

Note that, although only one first information processing terminal 201 and only one second information processing terminal 202 are illustrated in the example in FIG. 2, the number of terminals is not limited to these. For example, the display system 200 may include a plurality of first information processing terminals 201 or a plurality of second information processing terminals 202. Furthermore, the display system 200 does not need to include the information management server 203.

(Exemplary Hardware Configurations of First Information Processing Terminal 201 and Second Information Processing Terminal 202)

Next, exemplary hardware configurations of the first information processing terminal 201 and the second information processing terminal 202 will be described. Here, the first information processing terminal 201 and the second information processing terminal 202 are referred to as "first information processing terminal 201 or the like".

Figure 3:
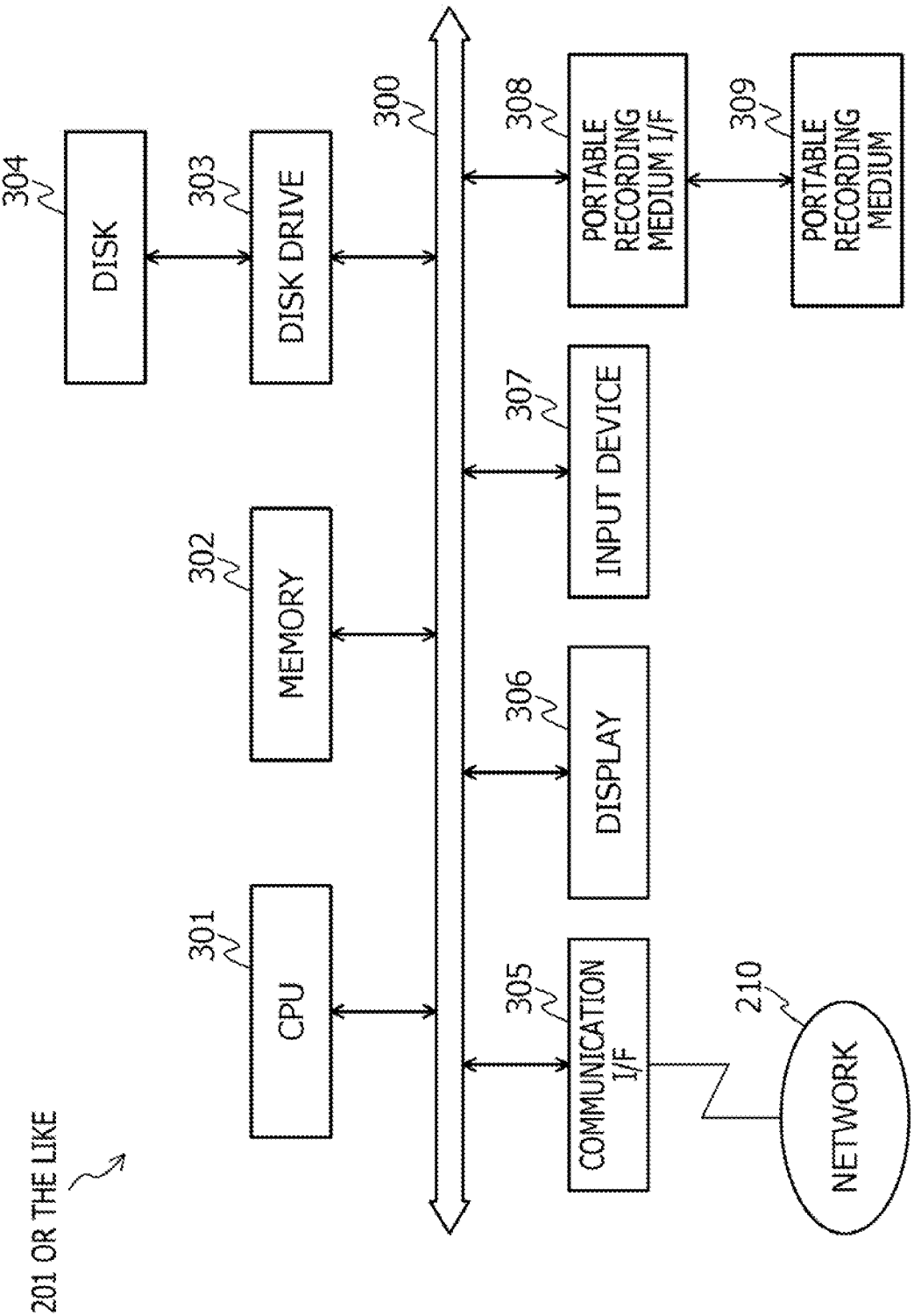

FIG. 3 is a block diagram illustrating an exemplary hardware configuration of the first information processing terminal 201 or the like. In FIG. 3, the first information processing terminal 201 or the like includes a Central Processing Unit (CPU) 301, a memory 302, a disk drive 303, a disk 304, a communication Interface (I/F) 305, a display 306, an input device 307, a portable recording medium I/F 308, and a portable recording medium 309. Furthermore, each of these components is connected to one another by a bus 300.

Here, the CPU 301 performs overall control of the first information processing terminal 201 or the like. The CPU 301 may include a plurality of cores. The memory 302 includes, for example, a Read Only Memory (ROM), a Random Access Memory (RAM), a flash ROM, or the like. Specifically, for example, the flash ROM stores operating system (OS) programs, the ROM stores application programs, and the RAM is used as a work area for the CPU 301. The programs stored in the memory 302 are loaded into the CPU 301 to cause the CPU 301 to execute coded processing.

The disk drive 303 controls reading and writing of data from and into the disk 304, under the control of the CPU 301. The disk 304 stores data written under the control of the disk drive 303. The disk 304 may be a magnetic disk, an optical disk, or the like, for example.

The communication I/F 305 is connected to the network 210 through a communication line and is connected to an external computer (for example, information management server 203 illustrated in FIG. 2) via the network 210. Then, the communication I/F 305 manages an interface between the network 210 and the inside of the device, and controls input and output of data from the external computer. For example, a modem, a LAN adapter, or the like may be adopted as the communication I/F 305.

The display 306 is a display device that displays data such as a document, an image, or function information, as well as a cursor, icons, or toolboxes. For example, a liquid crystal display, an organic electroluminescence (EL) display, or the like may be adopted as the display 306.

The input device 307 has keys for inputting characters, numbers, various instructions, and the like, and inputs data. The input device 307 may be a keyboard, a mouse, or the like, or a touch-panel input pad, an input pen, a numeric keypad, or the like, or a gesture interface.

The portable recording medium I/F 308 controls reading and writing of data from and into the portable recording medium 309 under the control of the CPU 301. The portable recording medium 309 stores data written under the control of the portable recording medium I/F 308. Examples of the portable recording medium 309 include a Compact Disc (CD)-ROM, a Digital Versatile Disk (DVD), a Universal Serial Bus (USB) memory, or the like.

Note that the first information processing terminal 201 or the like does not need to include, for example, the disk drive 303, the disk 304, the portable recording medium I/F 308, and the portable recording medium 309 among the components described above. Furthermore, the first information processing terminal 201 or the like may include, for example, a camera, a speaker, a microphone, or the like in addition to the components described above. Furthermore, the information management server 203 illustrated in FIG. 2 may be implemented by a hardware configuration similar to that of the first information processing terminal 201 or the like. However, the information management server 203 does not need to include, for example, the display 306 and the input device 307 among the components described above.

(Content Stored in Image Table 220)

Next, content stored in the image table 220 included in the first information processing terminal 201 will be described with reference to FIG. 4. The image table 220 is implemented by, for example, a storage device such as the memory 302 or the disk 304 illustrated in FIG. 3.

Figure 4:
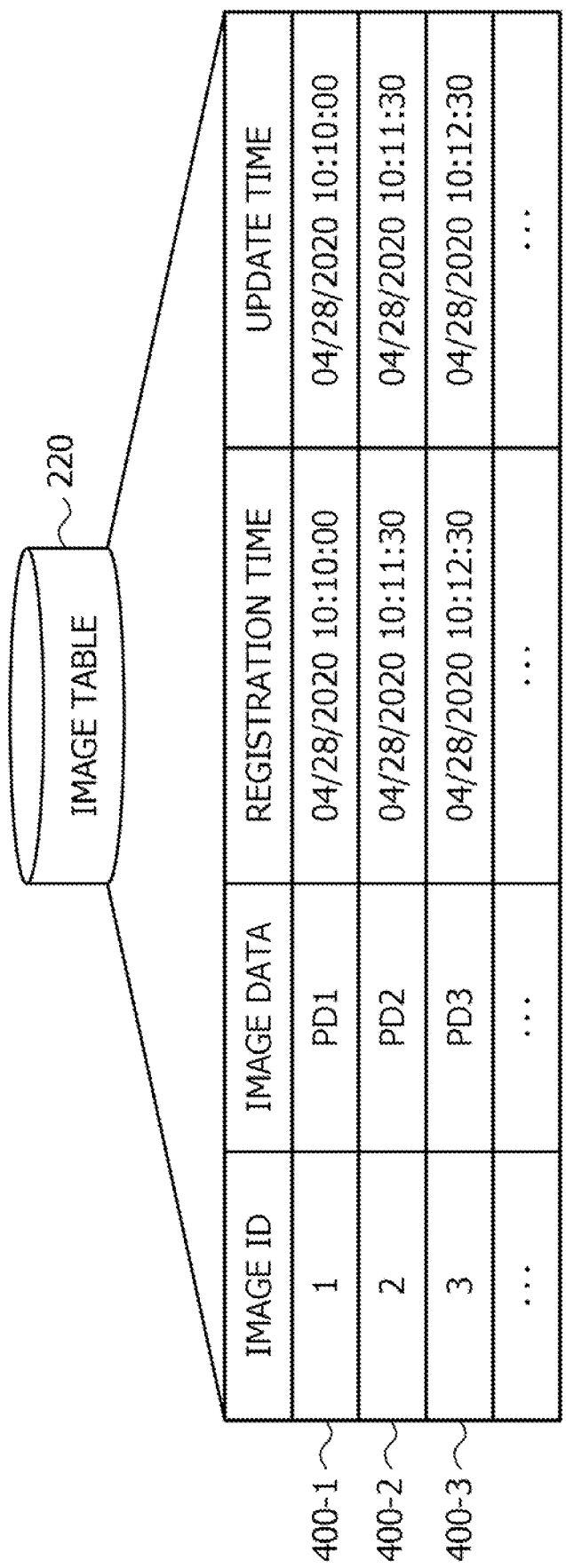
FIG. 4 is an explanatory diagram illustrating an example of content stored in an image table 220.

FIG. 4 is an explanatory diagram illustrating an example of the content stored in the image table 220. In FIG. 4, the image table 220 includes fields of an image ID, image data, a registration time, and an update time, and sets information to each field so as to store image management information (for example, image management information 400-1 to 400-3) as records.

Here, the image ID is an identifier used to uniquely identify image data. The image ID is assigned, for example, when the image data is displayed first. The image data is displayed image data. The registration time indicates a date and time when the image data is displayed first. The update time indicates a date and time when the image data is most recently displayed.

For example, the image management information 400-1 indicates a registration time "2020/04/28 10:10:00" and an update time "2020/04/28 10:10:00" of image data PD1 having an image ID "1". Here, because the image data PD1 having the image ID "1" is displayed only once, the registration time and the update time are the same.

(Content Stored in Annotation Table 230)

Next, content stored in the annotation table 230 included in the first information processing terminal 201 will be described with reference to FIG. 5. The annotation table 230 is implemented by, for example, a storage device such as the memory 302 or the disk 304 illustrated in FIG. 3.

Figure 5:
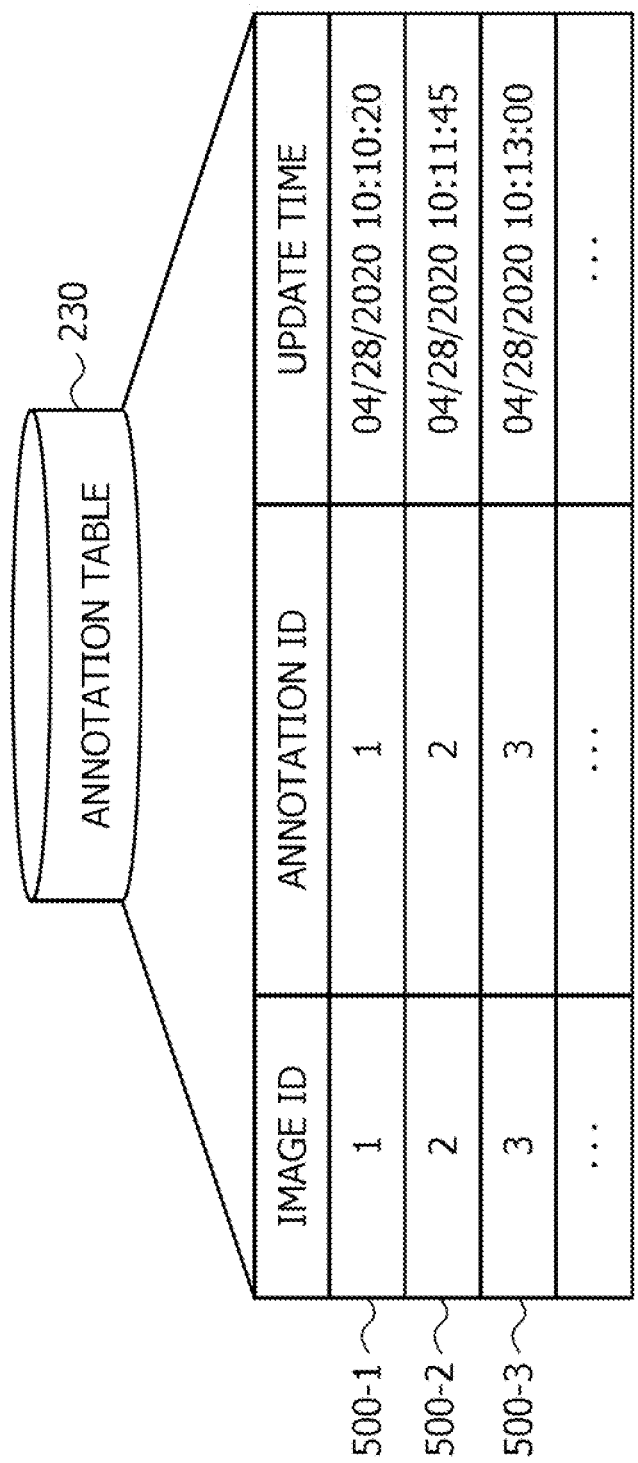
FIG. 5 is an explanatory diagram illustrating an example of content stored in an annotation table 230.

FIG. 5 is an explanatory diagram illustrating an example of the content stored in the annotation table 230. In FIG. 5, the annotation table 230 includes fields of an image ID, an annotation ID, and an update time and sets information to each field so as to store annotation management information (for example, annotation management information 500-1 to 500-3) as records.

Here, the image ID indicates an image ID of image data to which an annotation is added. The annotation ID is an identifier used to uniquely identify an annotation. The annotation ID is assigned, for example, when the annotation management information is created. The update time indicates a date and time when the annotation is created or updated.

For example, the annotation management information 500-1 indicates an image ID "1", an annotation ID "1", and an update time "2020/04/28 10:10:20".

Figure 6:
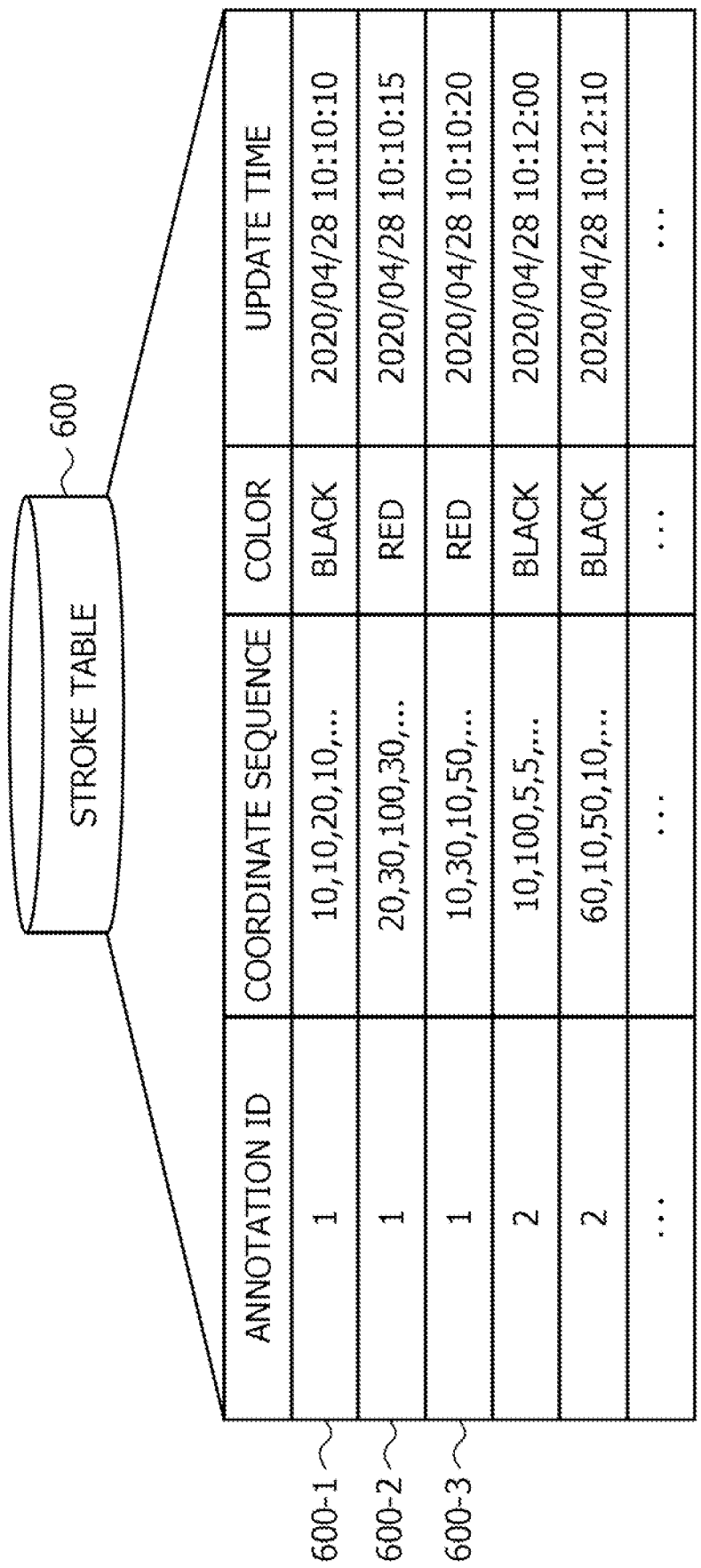
FIG. 6 is an explanatory diagram illustrating an example of content stored in a stroke table 600.

An entity of the annotation is, for example, stored in a stroke table 600 as illustrated in FIG. 6 described below. The stroke table 600 is, for example, included in the annotation table 230. Here, the content stored in the stroke table 600 will be described using a case where the annotation is a handwritten stroke as an example.

FIG. 6 is an explanatory diagram illustrating an example of the content stored in the stroke table 600. In FIG. 6, the stroke table 600 includes fields of an annotation ID, a coordinate sequence, a color, and an update time and sets information to each field so as to store stroke information (for example, stroke information 600-1 to 600-3) as records.

Here, the annotation ID is an identifier used to uniquely identify an annotation. The coordinate sequence indicates an array of coordinates forming a stroke included in an annotation. The coordinate sequence is, for example, information used to specify a position of the stroke on image data (or screen), and is a sequence of coordinates (x, y) that form the stroke and are arranged as "$x_0, y_0, x_1, y_1, x_2, y_2, \ldots, x_n, y_n$". The color indicates a color of the stroke. The update time indicates a date and time when the stroke is created or updated.

For example, the pieces of stroke information 600-1 to 600-3 indicate a coordinate sequence, color, and update time of each of three strokes included in an annotation having an annotation ID "1".

(Exemplary Functional Configuration of First Information Processing Terminal 201)

Next, an exemplary functional configuration of the first information processing terminal 201 according to the first embodiment will be described with reference to FIG. 7.

Figure 7:
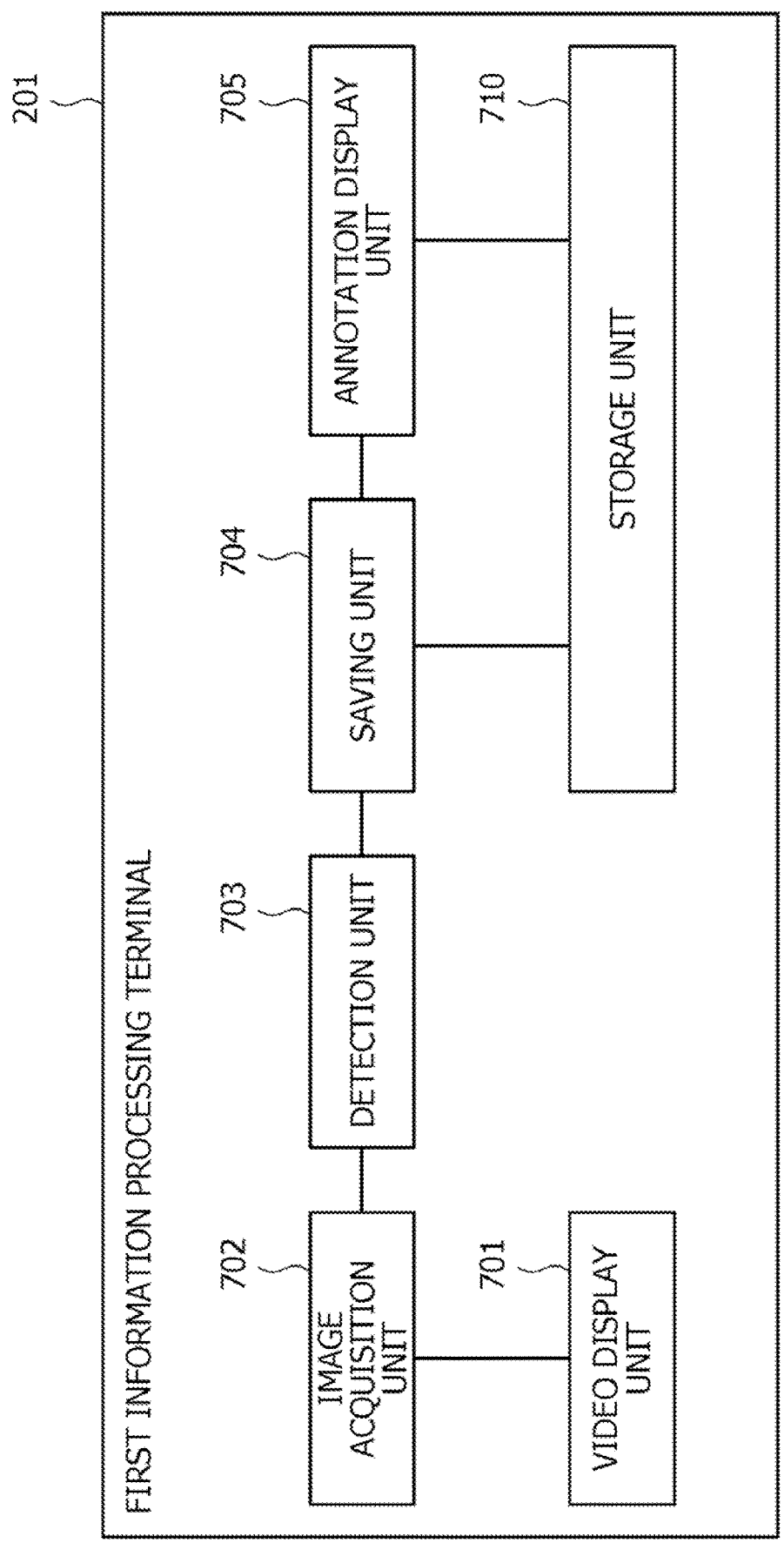
FIG. 7 is a block diagram illustrating an exemplary functional configuration of the first information processing terminal 201 according to the first embodiment.

FIG. 7 is a block diagram illustrating an exemplary functional configuration of the first information processing terminal 201 according to the first embodiment. In FIG. 7, the first information processing terminal 201 includes a video display unit 701, an image acquisition unit 702, a detection unit 703, a saving unit 704, an annotation display unit 705, and a storage unit 710. Specifically, for example, the video display unit 701 to the annotation display unit 705 implement the function by making the CPU 301 execute a program stored in a storage device such as the memory 302, the disk 304, or the portable recording medium 309 of the first information processing terminal 201 illustrated in FIG. 3 or with the communication I/F 305. A processing result of each functional unit is stored, for example, in a storage device such as the memory 302 or the disk 304. The storage unit 710 is implemented by a storage device such as the memory 302 or the disk 304, for example. Specifically, for example, the storage unit 710 stores the image table 220 illustrated in FIG. 4, the annotation table 230 illustrated in FIG. 5, and the stroke table 600 illustrated in FIG. 6.

The video display unit 701 displays video data. Here, the video data is a set of pieces of image data. The video data is, for example, information that may display content such as a document or a graph created by presentation software in a slide format. The video data may be created, for example, by the first information processing terminal 201 or may be acquired from the information management server 203 illustrated in FIG. 2.

Specifically, for example, the video display unit 701 displays the video data on the display 306 (refer to FIG. 3) of its own terminal. Furthermore, the video display unit 701 transmits image data obtained by capturing the content (screen) displayed on the display 306 of its own terminal to the second information processing terminal 202 illustrated in FIG. 2. The image data is transmitted, for example, at intervals of about 1/30 seconds.

As a result, a video the same as the video displayed on the first information processing terminal 201 may be displayed on the second information processing terminal 202. Note that, for example, when transmitting the image data to the second information processing terminal 202, the video display unit 701 may adopt a transmission method for transmitting only a difference image from the previous image data and reducing a transmission amount. Furthermore, various tables 220, 230, or the like are created, for example, when display of video data is started, for each video data.

The image acquisition unit 702 acquires image data to be displayed. Here, the image data to be displayed is, for example, image data to be displayed on the second information processing terminal 202. Specifically, for example, the image acquisition unit 702 acquires the image data by capturing the content (screen) displayed on the display 306 of its own terminal by the video display unit 701.

Note that the acquisition processing executed by the image acquisition unit 702 is executed, for example, for each fixed time period. The fixed time period may be set arbitrarily. The fixed time may be set to, for example, a time period of about one to three seconds, or may be set to a time period of about the same as a transmission interval of the image data to the second information processing terminal 202.

In the following description, there is a case where the image data to be displayed is referred to as "image data PD".

The detection unit 703 detects switching of the displayed image data PD. Specifically, for example, the detection unit 703 compares the latest image data PD acquired by the image acquisition unit 702 with immediately preceding image data PD acquired by the image acquisition unit 702 for each fixed time period, and calculates a similarity between the pieces of the image data.

The similarity between the pieces of the image data is calculated on the basis of a feature amount of each piece of image data PD. Note that, as a technique for calculating a similarity between pieces of image data, any existing technique may be used. For example, the detection unit 703 may calculate the similarity between the pieces of image data using a technique based on machine learning such as deep learning.

Then, in a case where the calculated similarity is less than a threshold Th1; the detection unit 703 detects switching of the displayed image data PD. On the other hand, in a case where the calculated similarity is equal to or more than the threshold Th1, the detection unit 703 does not detect the switching of the displayed image data PD. The threshold Th1 may be arbitrarily set. The threshold Th1 is set to, for example, a value of a degree that switching of a page of information created by presentation software may be detected.

Furthermore, for example, in a case where the page of the information or the like created by the presentation software is switched by an operation input of the user using the input device 307 of its own terminal, the detection unit 703 may detect the switching of the displayed image data PD.

The saving unit 704 may determine whether or not an annotation is added to first image data PD before switching in response to the detection of the switching of the displayed image data PD. Here, the annotation is an object superimposed and displayed on the image data PD, and is, for example, a handwritten stroke, a sticky note, a stamp image, or the like. The first image data PD before switching is image data PD acquired by the image acquisition unit 702 immediately before the image data PD of which the switching is detected by the detection unit 703.

Specifically, for example, the saving unit 704 may request the second information processing terminal 202 to transmit the annotation being displayed in response to the detection of the switching of the displayed image data PD. In this case, in a case of receiving the annotation from the second information processing terminal 202 in response to the request, the saving unit 704 determines that the annotation is added to the first image data PD before switching. On the other hand, in a case of not receiving the annotation from the second information processing terminal 202, the saving unit 704 determines that the annotation is not added to the first image data PD before switching. Note that, for example, information indicating an annotation creation time may be added to the annotation.

Furthermore, when the annotation is added when the image data transmitted from the first information processing terminal 201 is being displayed, the second information processing terminal 202 may transmit the annotation to the first information processing terminal 201. In this case, in a case where the annotation is received (acquired) from the second information processing terminal 202, for example, in a period immediately before switching, the saving unit 704 determines that the annotation is added to the first image data PD before switching. On the other hand, in a case where the annotation is not received from the second information processing terminal 202 in the period immediately before the switching, the saving unit 704 determines that the annotation is not added to the first image data PD before switching.

The period immediately before the switching is a period from a previous detection time when switching of the image data PD is detected by the detection unit 703 to a current detection time when the switching of the image data PD is detected by the detection unit 703. However, in a case of the first switching, the previous detection time is, for example, a time when display of the video data is started by the video display unit 701.

Furthermore, there is a case where a part of or the whole of the annotation added to the image data is deleted or updated. In this case, the second information processing terminal 202 may, for example, transmit the deleted or updated annotation to the first information processing terminal 201. As a result, the first information processing terminal 201 may acquire the latest annotation added to the image data even if a part or the whole of the annotation is deleted or updated. Furthermore, in a case where the whole of the annotation is deleted, the first information processing terminal 201 may determine that the annotation is not added to the image data.

In a case of determining that the annotation is added to the first image data PD, the saving unit 704 stores the annotation in the storage unit 710 in association with the first image data PD. Specifically, for example, in a case of determining that the annotation is added to the first image data PD, the saving unit 704 stores the annotation in the annotation table 230 in association with an image ID of the first image data PD.

Here, the image ID is an identifier used to uniquely identify the first image data PD. The image ID is added, for example, when the image data PD is newly registered in the image table 220. An entity of the annotation is stored in the stroke table 600 as illustrated in FIG. 6, for example, in association with the annotation ID. The entity of the annotation is information indicating a shape, a color, a position, or the like of the annotation. For example, in a case where the annotation is a handwritten stroke, the saving unit 704 stores a coordinate sequence, a color, an update time in the stroke table 600 in association with the annotation ID.

More specifically, for example, the saving unit 704 refers to the annotation table 230 and specifies annotation management information corresponding to the image ID of the first image data PD before switching. Note that the annotation management information corresponding to the image ID of each image data PD is, for example, created when each image data PD is displayed first. The annotation ID is assigned, for example, when the annotation management information is newly registered.

Then, the saving unit 704 sets a current time to an update time of the specified annotation management information. Furthermore, the saving unit 704 stores the entity of the annotation added to the first image data PD before switching in the stroke table 600 as illustrated in FIG. 6 in association with the annotation ID of the specified annotation management information. For example, in a case where the annotation is a handwritten stroke, the saving unit 704 stores a coordinate sequence, a color, an update time in the stroke table 600 in association with the annotation ID.

Furthermore, the saving unit 704 determines whether or not image data similar to second image data PD after switching exists in the storage unit 710. The second image data PD after switching is image data PD of which switching is detected by the detection unit 703. Specifically, for example, in a case of determining that the annotation is added to the first image data PD, the saving unit 704 searches the image table 220 for the image data similar to the second image data PD.

More specifically, for example, the saving unit 704 compares the second image data PD with the image data stored in the image table 220 and calculates a similarity between the pieces of image data. Then, the saving unit 704 searches for image data of which the calculated similarity is equal to or more than a threshold Th2. The threshold Th2 may be arbitrarily set. For example, the threshold Th2 is set to a value of a degree that it may be determined that the pieces of the image data are the same if the similarity is equal to or more than the threshold Th2.

Here, in a case where the image data of which the similarity is equal to or more than the threshold Th2 is searched, the saving unit 704 determines that the image data similar to the second image data PD exists. The similar image data is image data of which the similarity is equal to or more than the threshold Th2. At this time, the saving unit 704 updates an update time corresponding to the searched similar image data. For example, the saving unit 704 updates the update time to the current time. On the other hand, in a case where the image data of which the similarity is equal to or more than the threshold Th2 is not searched, the saving unit 704 determines that the image data similar to the second image data PD does not exist.

In a case of determining that the image data similar to the second image data PD does not exist, the saving unit 704 stores the second image data PD in the storage unit 710. Specifically, for example, in a case of determining that the image data similar to the second image data PD does not exist, the saving unit 704 adds an image ID to the second image data PD. Then, the saving unit 704 newly registers the second image data PD, a registration time, and an update time in the image table 220 in association with the added image ID. The registration time and the update time here are, for example, a date and time when the second image data PD is registered.

In a case where it is determined that the annotation is added to the first image data PD, the annotation display unit 705 hides the annotation added to the first image data PD. Specifically, for example, the annotation display unit 705 transmits an annotation non-display control message to the second information processing terminal 202.

The annotation non-display control message is a message that instructs to hide an annotation superimposed and displayed on the image data being displayed. When receiving the annotation non-display control message, the second information processing terminal 202 hides the annotation superimposed and being displayed on the image data displayed on the display 306 of its own terminal.

Furthermore, in a case where it is determined that the image data similar to the second image data PD exists, the annotation display unit 705 superimposes and displays an annotation stored in the storage unit 710 in association with the similar image data on the second image data PD.

Specifically, for example, the annotation display unit 705 specifies the annotation stored in the annotation table 230 in association with the image data similar to the second image data PD searched from the image table 220. Then, the annotation display unit 705 transmits the specified annotation to the second information processing terminal 202 so as to superimpose and display the annotation on the second image data PD.

For example, an image ID of the image data similar to the second image data PD searched from the image table 220 is set to "1". Furthermore, a case is assumed where the annotation is a handwritten stroke. In this case, the annotation display unit 705 refers to the annotation table 230 and specifies an annotation ID "1" corresponding to the image ID "1".

Next, the annotation display unit 705 refers to the stroke table 600 and specifies stroke information 600-1 to 600-3 corresponding to the annotation ID "1". Then, the annotation display unit 705 transmits an annotation display control message including the specified stroke information 600-1 to 600-3 to the second information processing terminal 202.

The annotation display control message is a message that instructs to superimpose and display an annotation on the image data being displayed. When receiving the annotation display control message, the second information processing terminal 202 displays an annotation while superimposing the annotation (handwritten stroke) on the image data being displayed on the display 306 of its own terminal on the basis of the stroke information 600-1 to 600-3 included in the annotation display control message.

Furthermore, when determining whether or not the image data similar to the second image data PD exists in the storage unit 710, the saving unit 704 may determine whether or not the similar image data exists in the storage unit 710 at the time of previous image switching. The time of previous image switching is the time when switching to the first image data PD before switching to the second image data PD is detected.

In other words, for example, when the switching to the first image data PD before the switching to the second image data PD is detected, the saving unit 704 may determine whether or not the image data similar to the first image data PD exists in the storage unit 710 (for example, image table 220).

Here, in a case where the image data similar to the first image data PD does not exist in the storage unit 710, the saving unit 704 may refer to the storage unit 710 and determine whether or not image data is similar to the second image data PD in order of priority from image data of which a time when the image data is most recently displayed is the newest from among the plurality of pieces of image data.

On the other hand, in a case where the image data similar to the first image data PD exists in the storage unit 710, the saving unit 704 may refer to the storage unit 710 and determine whether or not image data is similar to the second image data PD in order of priority from image data of which a time when the image data is displayed first is closer to the image data similar to the first image data PD from among the plurality of pieces of image data.

Processing content in determining whether or not the image data similar to the second image data PD exists will be described with reference to FIGS. 8 and 9.

Note that the video display unit 701 of functional units of the first information processing terminal 201 described above may be, for example, implemented by an existing image transmission application different from this annotation display program.

Furthermore, in the description described above, a case where the annotation is superimposed and displayed on the image data displayed on the second information processing terminal 202 has been described as an example. However, the present embodiment is not limited to this. For example, this annotation display program may be applied to a case where the annotation is superimposed and displayed on the image data displayed on the first information processing terminal 201.

Furthermore, each functional unit of the first information processing terminal 201 described above may be implemented by another computer in the display system 200, for example, the second information processing terminal 202. In this case, the second information processing terminal 202 includes the image table 220 and the annotation table 230.

(Processing for Determining Whether or Not Similar Image Data Exists)

Next, an example of processing content in determining whether or not image data similar to the second image data PD exists will be described with reference to FIGS. 8 and 9. Here, a case is assumed where the image data similar to the second image data PD is searched from the image table 220. In a case where the image data similar to the second image data PD is not searched, the second image data PD is newly registered in the image table 220.

Figure 8:
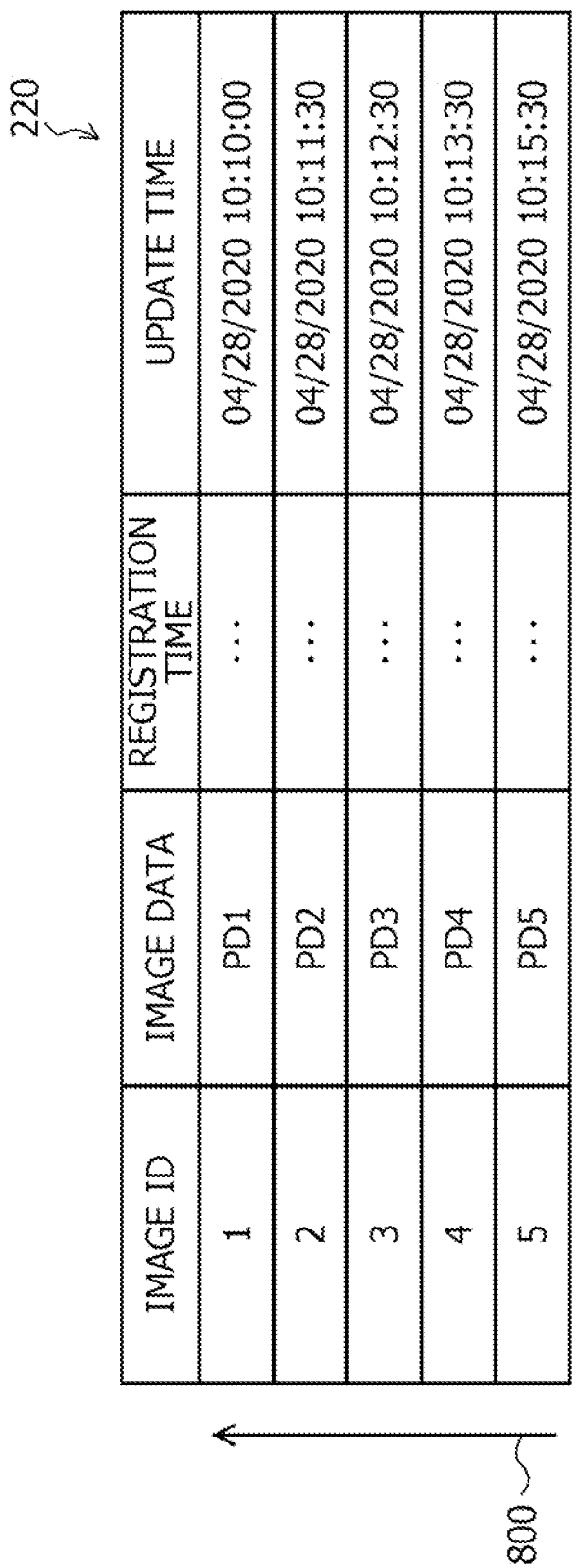
FIG. 8 is an explanatory diagram (No. 1) illustrating a search order of similar image data.

FIGS. 8 and 9 are explanatory diagrams illustrating a search order of the similar image data. When determining whether or not the image data similar to the second image data PD exists in the image table 220, the saving unit 704 determines whether or not the similar image data has existed in the image table 220 at the time of previous image switching.

Note that the time of previous image switching is a time when switching to the first image data PD before switching to the second image data PD is detected.

First, a case is assumed where the image data similar to the first image data PD does not exist in the image table 220. From the fact that the similar image data has not been searched at the time of previous image switching, for example, a usage scene is assumed where new slides (pages) are sequentially viewed according to slide numbers.

In this case, the slide numbers of the displayed slides do not largely change in a jumping manner in such a way that "1→2→100", and often change in such a way that "1→2→3→2→3". Therefore, for example, the saving unit 704 determines whether or not the image data is similar to the second image data PD in order of priority from image data of which a time when the image data is most recently displayed is the newest from among the plurality of pieces of image data stored in the image table 220.

The most recently displayed time corresponds to the update time in the image table 220. In other words, for example, the saving unit 704 calculates, with reference to the image table 220, the similarity of the image data with the second image data PD in order of priority from the image data of which the update time is the latest so as to search for the image data similar to the second image data PD.

In the example in FIG. 8, the saving unit 704 refers to the update time in the image table 220 and calculates the similarity with the second image data PD in order of image data "PD5→PD4→PD3→PD2→PD1" (refer to arrow 800 in FIG. 8). As a result, the image data similar to the second image data PD may be efficiently searched from the image table 220.

Next, a case is assumed where the image data similar to the first image data PD exists in the image table 220. From the fact that the similar image data is searched at the time of previous image switching, for example, a usage scene is assumed where a page is returned to the viewed previous page and discussion is made again.

For example, in a case where, after viewing the pages in order of slide numbers as "1→2→3→ ... →98→99→100", the page jumps to a page having the slide number "3", there is a high possibility that a page of which a slide number is close to "3" is then viewed. Therefore, for example, the saving unit 704 determines whether or not image data is similar to the second image data PD in order of priority from image data of which a time when the image data is displayed first is closer to the image data similar to the first image data PD, from among the plurality of pieces of image data stored in the image table 220.

The time displayed first corresponds to the registration time in the image table 220. In other words, for example, the saving unit 704 calculates, with reference to the image table 220, the similarity of the image data with the second image data PD in order of priority from the image data of which the registration time is closer to that of the image data similar to the first image data PD so as to search for the image data similar to the second image data PD.

In the example in FIG. 9, the image data similar to the first image data PD is referred to as "image data PD3". In this case, the saving unit 704 refers to the registration time in the image table 220 and calculates the similarity with the second image data PD in order of image data "PD4→PD2→PD1→PD5" of which the registration time is closer to that of the image data PD3 (refer to arrow 900 in FIG. 9). As a result, the image data similar to the second image data PD may be efficiently searched from the image table 220.

Note that, in a case where there is a plurality of pieces of image data of which a time difference from the registration time of the image data similar to the first image data PD such as the image data PD2 and PD4 illustrated in FIG. 9, an order in which similarities of these pieces of image data are calculated may be arbitrarily set.

(Annotation Display Processing Procedure of First Information Processing Terminal 201)

Next, an annotation display processing procedure of the first information processing terminal 201 according to the first embodiment will be described. Here, a case is assumed where video data is transmitted from the first information processing terminal 201 to the second information processing terminal 202. Furthermore, a case is assumed where the transmission of the video data from the first information processing terminal 201 to the second information processing terminal 202 is started.

Figure 10:
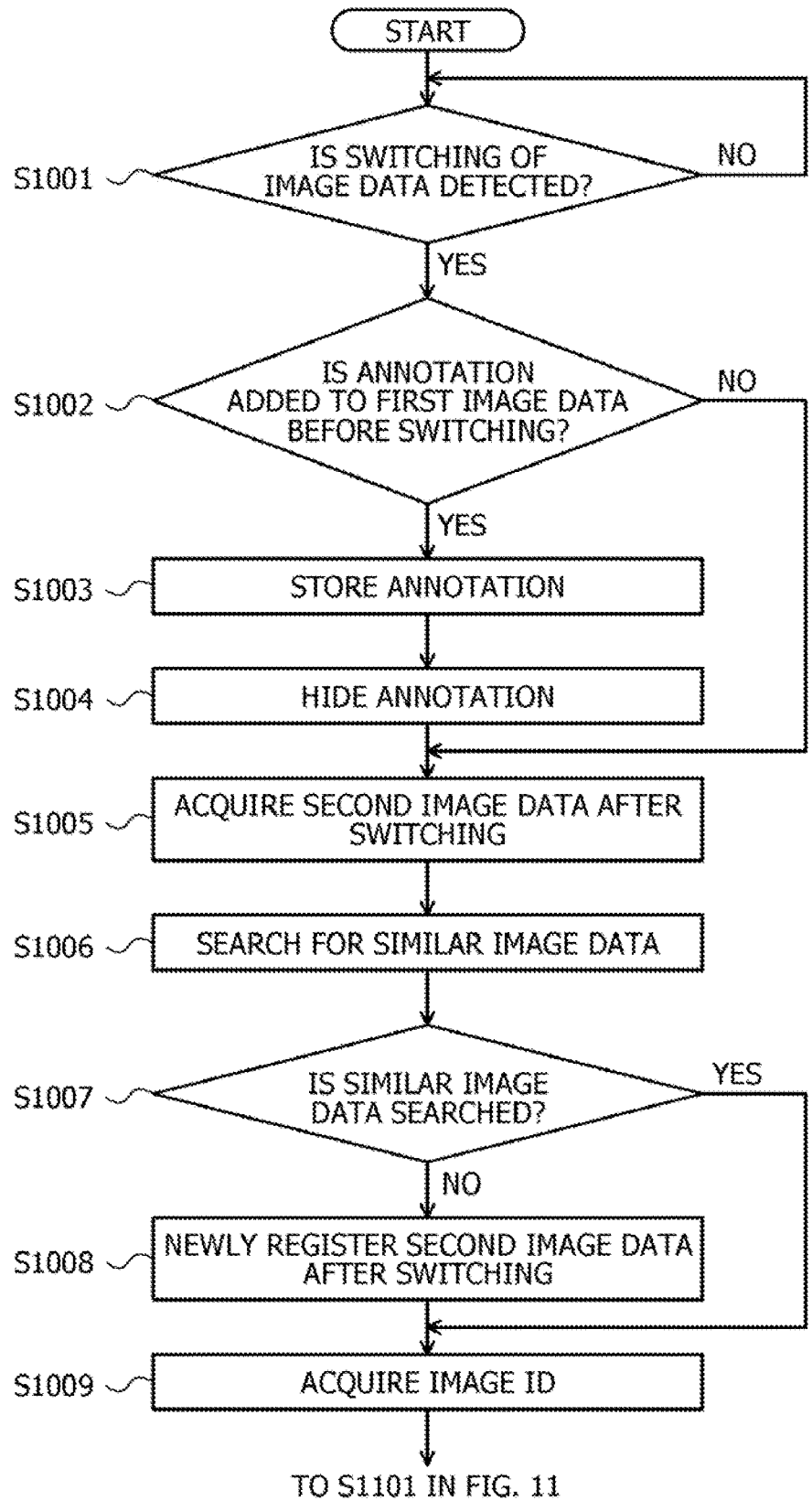
FIG. 10 is a flowchart (No. 1) illustrating an example of an annotation display processing procedure of the first information processing terminal 201 according to the first embodiment.
Figure 11:
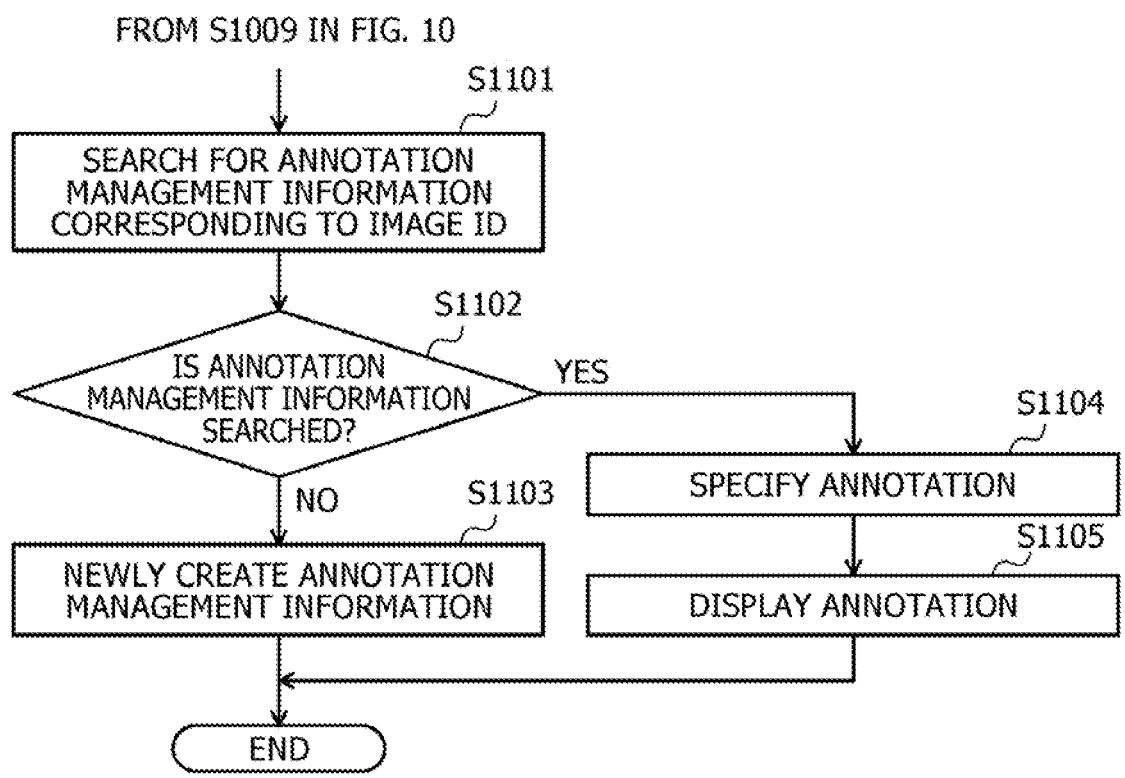
FIG. 11 is a flowchart (No. 2) illustrating an example of the annotation display processing procedure of the first information processing terminal 201 according to the first embodiment.

FIGS. 10 and 11 are flowcharts illustrating an example of the annotation display processing procedure of the first information processing terminal 201 according to the first embodiment. In the flowchart in FIG. 10, first, the first information processing terminal 201 determines whether or not switching of displayed image data PD is detected (step S1001).

Here, the first information processing terminal 201 waits for the detection of the switching of the displayed image data PD (step S1001: No). In a case of detecting the switching of the displayed image data PD (step S1001: Yes), the first information processing terminal 201 determines whether or not an annotation is added to first image data PD before switching (step S1002).

Here, in a case where the annotation is not added (step S1002: No), the first information processing terminal 201 proceeds to step S1005. On the other hand, in a case where the annotation is added (step S1002: Yes), the first information processing terminal 201 stores the annotation added to the first image data PD in the annotation table 230 in association with the first image data PD before switching (step S1003).

Then, the first information processing terminal 201 hides the annotation added to the first image data PD (step S1004). Specifically, for example, the first information processing terminal 201 transmits an annotation non-display control message to the second information processing terminal 202. Note that, in step S1002, the first information processing terminal 201 proceeds to step S1005 in a case where screen data PD after switching is first image data PD.

Next, the first information processing terminal 201 acquires second image data PD after switching (step S1005). Then, the first information processing terminal 201 searches the image table 220 for image data similar to the acquired second image data PD (step S1006).

Next, the first information processing terminal 201 determines whether or not the similar image data is searched (step S1007). Here, in a case where the similar image data is searched (step S1007: Yes), the first information processing terminal 201 proceeds to step S1009, and acquires an image ID of the searched similar image data (step S1009), and proceeds to step S1101 illustrated in FIG. 11.

On the other hand, in a case where the similar image data is not searched (step S1007: No), the first information processing terminal 201 newly registers the second image data PD after switching in the image table 220 (step S1008). At this time, the first information processing terminal 201 assigns an image ID to the second image data PD after switching. Then, the first information processing terminal 201 acquires the image ID of the second image data PD after switching (step S1009) and proceeds to step S1101 illustrated in FIG. 11.

In the flowchart in FIG. 11, first, the first information processing terminal 201 searches the annotation table 230 for annotation management information corresponding to the acquired image ID (step S1101). Then, the first information processing terminal 201 determines whether or not the annotation management information is searched (step S1102).

Here, in a case where the annotation management information is not searched (step S1102: No), the first information processing terminal 201 newly creates the annotation management information corresponding to the acquired image ID in the annotation table 230 (step S1103), and ends a series of processing according to this flowchart.

On the other hand, in a case where the annotation management information is searched (step S1102: Yes), the first information processing terminal 201 refers to the searched annotation management information and specifies an annotation that is stored in association with the acquired image ID (step S1104). Then, the first information processing terminal 201 superimposes and displays the specified annotation on the second image data PD after switching (step S1105) and ends the series of processing according to this flowchart.

As a result, when the image data is transmitted from the first information processing terminal 201 to the second information processing terminal 202 and is displayed, it is possible to redisplay the annotation added to the image data in the past. Note that, in a case where the annotation that is stored in association with the acquired image ID is not specified from the stroke table 600 or the like in step S1104, the annotation is not displayed on the second image data PD after switching.

As described above, according to the display system 200 according to the first embodiment, the first information processing terminal 201 determines whether or not the annotation is added to the first image data PD before switching in response to the detection of the switching of the displayed image data PD and may store the annotation in the storage unit 710 in association with the first image data PD in a case where it is determined that the annotation is added to the first image data PD. Furthermore, the first information processing terminal 201 determines whether or not the image data similar to the second image data PD after switching exists in the storage unit 710, and in a case of determining that the similar image data exists, the first information processing terminal 201 may superimpose and display the annotation stored in the storage unit 710 in association with the similar image data on the second image data PD. The displayed image data PD is, for example, image data that is transmitted from the first information processing terminal 201 to the second information processing terminal 202 and is displayed on the second information processing terminal 202.

As a result, when the image data is displayed, it is possible to redisplay the annotation added to the image data in the past. Therefore, at the time of switching the displayed image data, there is no need for a user to perform a troublesome work for manually re-adding the annotation to the image data after switching.

Furthermore, according to the display system 200 according to the first embodiment, when determining whether or not the image data similar to the second image data PD after switching exists, the first information processing terminal 201 may determine whether or not the similar image data exists in the storage unit 710 at the time of previous image switching. The time of previous image switching is the time when switching to the first image data PD before switching to the second image data PD is detected. Then, in a case where the similar image data does not exist at the time of previous image switching, the first information processing terminal 201 may refer to the storage unit 710 and may determine whether or not image data is similar to the second image data PD in order of priority from image data of which a time when the image data is most recently displayed is the newest from among the plurality of pieces of image data.

As a result, for example, in a usage scene in which new slides (pages) are sequentially viewed according to the slide numbers, it is possible to efficiently search for the image data similar to the second image data PD.

Furthermore, according to the display system 200 according to the first embodiment, in a case where the similar image data exists at the time of previous image switching, the first information processing terminal 201 may refer to the storage unit 710 and determine whether or not image data is similar to the second image data PD in order of priority from image data of which a time when the image data is displayed first is closer to the image data similar to the first image data PD from among the plurality of pieces of image data.

As a result, for example, in a usage scene in which the page is returned to the viewed previous page and discussion is made again, it is possible to efficiently search for the image data similar to the second image data PD.

Furthermore, according to the display system 200 according to the first embodiment, in a case of determining that the annotation is added to the first image data PD, the first information processing terminal 201 may hide the annotation.

As a result, there is no need for a user to perform a troublesome work for manually deleting the annotation added to the image data before switching.

From these, according to the display system 200 according to the first embodiment, at the time of switching the displayed image data, there is no need for a user to manually delete the annotation added to the image data before switching or re-add the annotation to the image data after switching, and it is possible to enhance a work efficiency. Furthermore, because the annotation is saved in association with the displayed image data, it is not needed to add a function for saving an annotation in an application (for example, presentation software) that creates content such as a document or a graph. Furthermore, even if a slide ID or the like that uniquely identifies each slide (page) is not assigned in advance when the presentation software or the like creates content, it is possible to identify the image data on the basis of a degree of similarity between the pieces of image data and redisplay the annotation that has been added to the image data in the past.

Second Embodiment

Next, an annotation display method according to a second embodiment will be described. In the second embodiment, a case will be described where a function of the first information processing terminal 201 according to the first embodiment is implemented by a plurality of computers in the display system 200. Note that illustration and description of a part similar to the part described in the first embodiment are omitted.

(Exemplary Functional Configuration of Display System 200)

Next, an exemplary functional configuration of the display system 200 according to the second embodiment will be described with reference to FIG. 12. In the second embodiment, a case will be described where the function of the first information processing terminal 201 according to the first embodiment is implemented by the first information processing terminal 201 and the second information processing terminal 202 in the display system 200.

Figure 12:
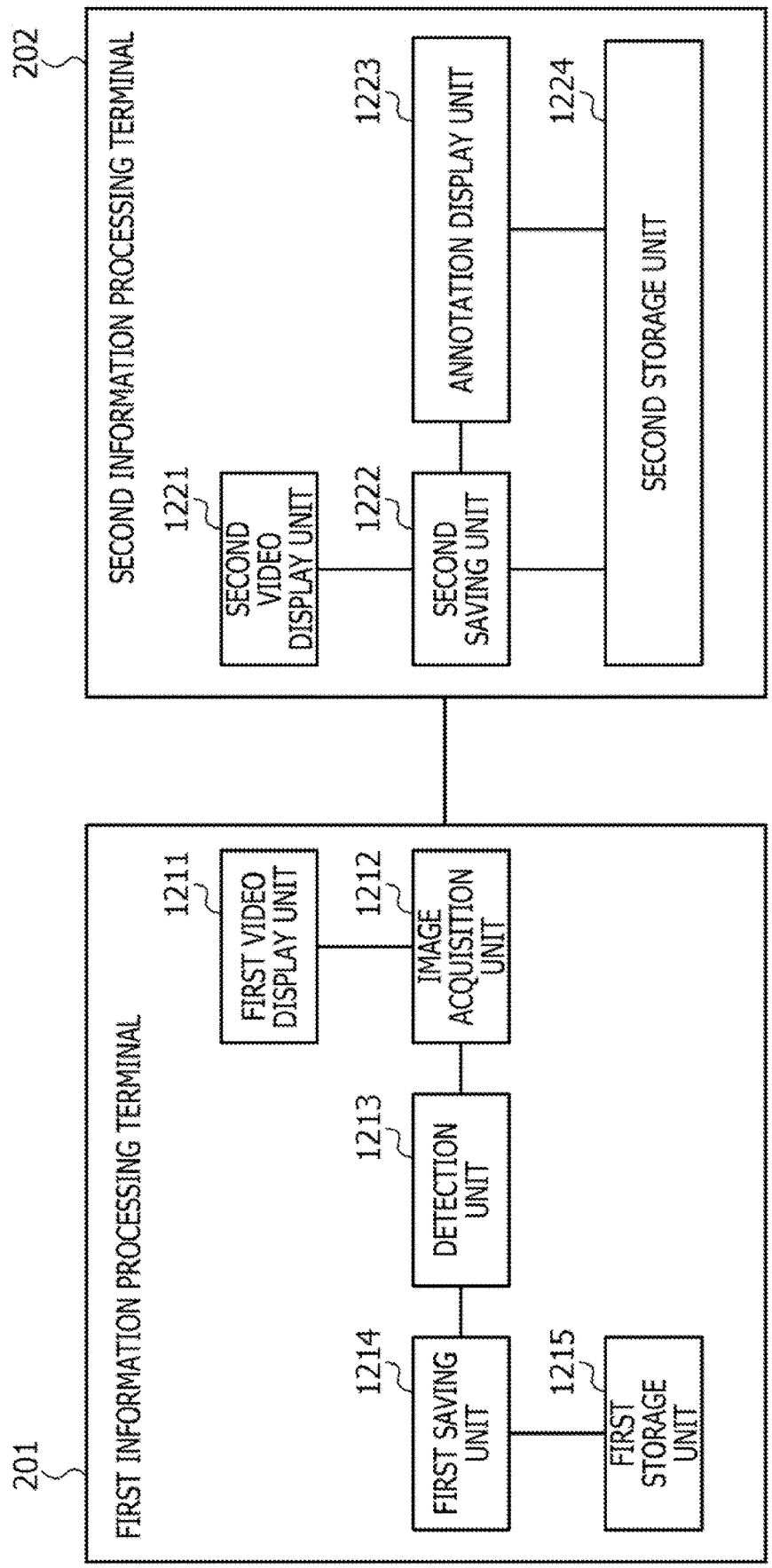
FIG. 12 is a block diagram illustrating an exemplary functional configuration of a first information processing terminal 201 and a second information processing terminal 202 according to a second embodiment.

FIG. 12 is a block diagram illustrating an exemplary functional configuration of the first information processing terminal 201 and the second information processing terminal 202 according to the second embodiment. First, an exemplary functional configuration of the first information processing terminal 201 according to the second embodiment will be described.

In FIG. 12, the first information processing terminal 201 includes a first video display unit 1211, an image acquisition unit 1212, a detection unit 1213, a first saving unit 1214, and a first storage unit 1215. Specifically, for example, the first video display unit 1211 to the first saving unit 1214 implement the function by making the CPU 301 execute a program stored in a storage device such as the memory 302, the disk 304, or the portable recording medium 309 of the first information processing terminal 201 illustrated in FIG. 3 or with the communication I/F 305. A processing result of each functional unit is stored, for example, in the storage device such as the memory 302 or the disk 304 of the first information processing terminal 201. Furthermore, the first storage unit 1215 is implemented, for example, by the storage device such as the memory 302 or the disk 304 of the first information processing terminal 201. Specifically, for example, the first storage unit 1215 stores the image table 220 illustrated in FIG. 4.

The first video display unit 1211 displays video data. Specifically, for example, the first video display unit 1211 displays video data on a display 306 of its own terminal. Furthermore, the first video display unit 1211 transmits image data obtained by capturing content (screen) displayed on the display 306 of its own terminal to the second information processing terminal 202.

The image acquisition unit 1212 acquires image data PD to be displayed. Specifically, for example, the image acquisition unit 1212 acquires the image data by capturing the content (screen) displayed on the display 306 of its own terminal by the first video display unit 1211. Note that the acquisition processing executed by the image acquisition unit 1212 is executed, for example, for each fixed time period.

The detection unit 1213 detects switching of the displayed image data PD. Specifically, for example, the detection unit 1213 compares the latest image data PD acquired by the image acquisition unit 1212 and immediately preceding image data PD acquired by the image acquisition unit 1212 for each fixed time period, and calculates a similarity between the pieces of the image data.

Then, in a case where the calculated similarity is less than a threshold Th1, the detection unit 1213 detects switching of the displayed image data PD. On the other hand, in a case where the calculated similarity is equal to or more than the threshold Th1, the detection unit 1213 does not detect the switching of the displayed image data PD. Furthermore, for example, in a case where a page of information or the like created by presentation software is switched by an operation input of a user using the input device 307 of its own terminal, the detection unit 1213 may detect the switching of the displayed image data PD.

The first saving unit 1214 transmits an annotation non-display control message to the second information processing terminal 202 in response to the detection of the switching of the displayed image data PD. The annotation non-display control message is a message that instructs to hide an annotation superimposed and displayed on the image data being displayed.

Note that the annotation non-display control message may include an identifier used to identify the first image data PD before switching, for example, an image ID of the first image data PD.

Furthermore, the first saving unit 1214 determines whether or not the image data similar to the second image data PD after switching exists in the first storage unit 1215. Specifically, for example, the first saving unit 1214 searches the image table 220 for the image data similar to the second image data PD.

More specifically, for example, the first saving unit 1214 compares the second image data PD with the image data stored in the image table 220 and calculates a similarity between the pieces of image data. Then, the first saving unit 1214 searches for image data of which the calculated similarity is equal to or more than a threshold Th2. Here, in a case where the image data of which the similarity is equal to or more than the threshold Th2 is searched, the first saving unit 1214 determines that the image data similar to the second image data PD exists. On the other hand, in a case where the image data of which the similarity is equal to or more than the threshold Th2 is not searched, the first saving unit 1214 determines that the image data similar to the second image data PD does not exist.

In a case of determining that the image data similar to the second image data PD does not exist, the first saving unit 1214 stores the second image data PD in the first storage unit 1215. Specifically, for example, in a case of determining that the image data similar to the second image data PD does not exist, the first saving unit 1214 adds an image ID to the second image data PD. Then, the first saving unit 1214 newly registers the second image data PD, a registration time, and an update time in the image table 220 in association with the added image ID. The registration time and the update time here are, for example, a date and time when the second image data PD is registered.

Furthermore, in a case where it is determined that the image data similar to the second image data PD exists, the first saving unit 1214 transmits an annotation display control message to the second information processing terminal 202. The annotation display control message is a message that instructs to superimpose and display an annotation on the image data being displayed. The annotation display control message includes an identifier used to identify the image data similar to the second image data PD, for example, an image ID.

Next, an exemplary functional configuration of the second information processing terminal 202 according to the second embodiment will be described.

In FIG. 12, the second information processing terminal 202 includes a second video display unit 1221, a second saving unit 1222, an annotation display unit 1223, and a second storage unit 1224. Specifically, for example, the second video display unit 1221 to the annotation display unit 1223 implement the function by making the CPU 301 execute a program stored in a storage device such as the memory 302, the disk 304, or the portable recording medium 309 of the second information processing terminal 202 illustrated in FIG. 3 or with the communication I/F 305. A processing result of each functional unit is stored, for example, in the storage device such as the memory 302 or the disk 304 of the second information processing terminal 202. The second storage unit 1224 is implemented, for example, by the storage device such as the memory 302 or the disk 304 of the second information processing terminal 202. Specifically, for example, the second storage unit 1224 stores the annotation table 230 illustrated in FIG. 5 and the stroke table 600 illustrated in FIG. 6.

The second video display unit 1221 displays video data. Specifically, for example, the second video display unit 1221 displays image data received from the first information processing terminal 201 on the display 306 of its own terminal. The image data is transmitted from the first information processing terminal 201 to the second information processing terminal 202, for example, at intervals of about 1/30 seconds.

In a case of receiving the annotation non-display control message, the second saving unit 1222 determines whether or not an annotation is added to the first image data PD before switching. Specifically, for example, the second saving unit 1222 determines whether or not there is an annotation superimposed and being displayed on image data displayed on the display 306 of its own terminal.

Here, in a case where the annotation being displayed exists, the second saving unit 1222 determines that the annotation is added to the first image data PD before switching. On the other hand, in a case where the annotation being displayed does not exist, the second saving unit 1222 determines that the annotation is not added to the first image data PD before switching.

Furthermore, in a case where it is determined that the annotation is added to the first image data PD before switching, the second saving unit 1222 stores the annotation in the second storage unit 1224 in association with an identifier used to identify the first image data PD. The identifier used to identify the first image data PD is, for example, an image ID of the first image data PD.

The image ID of the first image data PD may be, for example, included in the annotation non-display control message. Furthermore, as the image ID of the first image data PD, the image ID included in the annotation display control message received from the first information processing terminal 201 immediately before the annotation non-display control message may be used.

Specifically, for example, in a case of determining that the annotation is added to the first image data PD before switching, the second saving unit 1222 stores the annotation being displayed in the annotation table 230 in association with the image ID of the first image data PD. The annotation being displayed is an annotation superimposed and displayed on the image data being displayed on the display 306 of its own terminal.

The annotation being displayed corresponds to an annotation added to the first image data PD before switching. An entity of the annotation is stored in the stroke table 600 as illustrated in FIG. 6, for example, in association with the annotation ID.

More specifically, for example, the second saving unit 1222 refers to the annotation table 230 and specifies annotation management information corresponding to the image ID of the first image data PD before switching. Then, the second saving unit 1222 sets a current time to an update time of the specified annotation management information. Furthermore, the second saving unit 1222 stores an entity of the annotation being displayed in the stroke table 600 as illustrated in FIG. 6 in association with an annotation ID of the specified annotation management information.

In a case where it is determined that the annotation is added to the first image data PD before switching, the annotation display unit 1223 hides the annotation. Specifically, for example, the annotation display unit 1223 hides the annotation superimposed and being displayed on the image data displayed on the display 306 of its own terminal.

Furthermore, in a case of receiving the annotation display control message, the annotation display unit 1223 refers to the second storage unit 1224 and superimposes and displays, on the second image data, an annotation stored in the second storage unit 1224 in association with the identifier used to identify the image data similar to the second image data PD after switching.

Specifically, for example, the annotation display unit 1223 specifies an annotation stored in the annotation table 230 in association with the image ID included in the annotation display control message. Then, the annotation display unit 1223 superimposes and displays the specified annotation on image data (second image data PD after switching) displayed on the display 306 of its own terminal.

For example, an image ID included in the annotation display control message is set to "1". Furthermore, a case is assumed where the annotation is a handwritten stroke. In this case, the annotation display unit 1223 refers to the annotation table 230 and specifies an annotation ID "1" corresponding to the image ID "1".

Next, the annotation display unit 1223 refers to the stroke table 600 and specifies stroke information 600-1 to 600-3 corresponding to the annotation ID "1". Then, the annotation display unit 1223 superimposes and displays the annotation (handwritten stroke) on the image data being displayed on the display 306 of its own terminal on the basis of the specified stroke information 600-1 to 600-3.

Note that the first video display unit 1211 of the first information processing terminal 201 and the second video display unit 1221 of the second information processing terminal 202 correspond to, for example, the video display unit 701 illustrated in FIG. 7. The image acquisition unit 1212 of the first information processing terminal 201 corresponds to, for example, the image acquisition unit 702 illustrated in FIG. 7. The detection unit 1213 of the first information processing terminal 201 corresponds to, for example, the detection unit 703 illustrated in FIG. 7. The first saving unit 1214 of the first information processing terminal 201 and the second saving unit 1222 of the second information processing terminal 202 correspond to, for example, the saving unit 704 illustrated in FIG. 7. The annotation display unit 1223 of the second information processing terminal 202 corresponds to, for example, the annotation display unit 705 illustrated in FIG. 7.

(Operation Example of Display System 200)

Next, an operation example of the display system 200 according to the second embodiment will be described.

Figure 13:
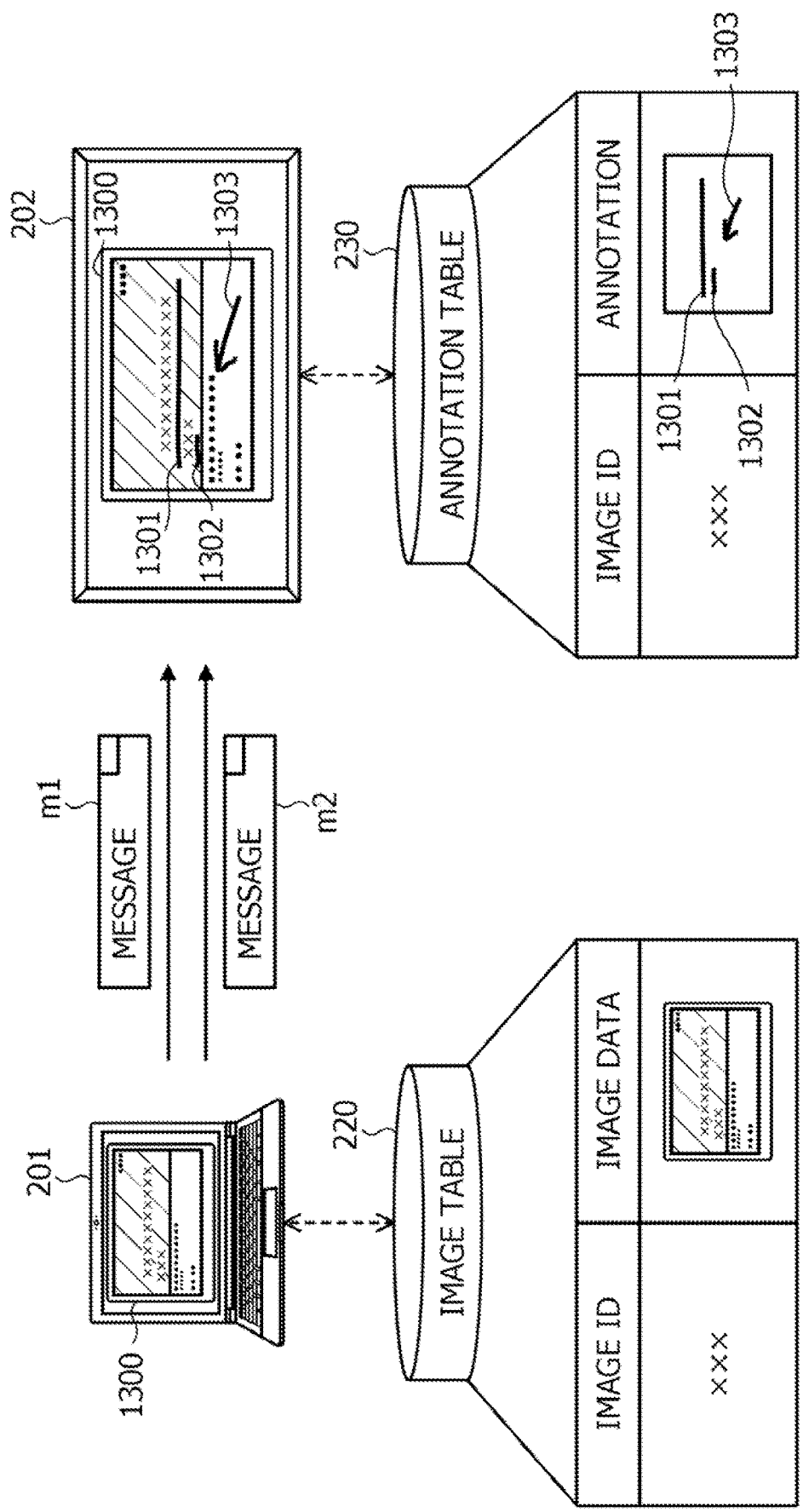
FIG. 13 is an explanatory diagram illustrating an operation example of a display system 200 according to the second embodiment.

FIG. 13 is an explanatory diagram illustrating an operation example of the display system 200 according to the second embodiment. In FIG. 13, the first information processing terminal 201 transmits an annotation non-display control message m1 to the second information processing terminal 202 in response to detection of switching of the displayed image data PD.

In a case of receiving the annotation non-display control message m1, the second information processing terminal 202 determines whether or not an annotation is added to first image data before switching. Specifically, for example, the second information processing terminal 202 determines whether or not there is an annotation superimposed and being displayed on image data displayed on the display 306 of its own terminal.

In a case of determining that the annotation is added, the second information processing terminal 202 hides the annotation and stores the annotation in the annotation table 230 in association with an image ID of the first image data before switching.

Note that the image ID of the first image data before switching may be, for example, included in the annotation non-display control message m1. Furthermore, the second information processing terminal 202 may use an image ID included in an annotation display control message (not illustrated) received immediately before the annotation non-display control message m1 as the image ID of the first image data before switching.

The first information processing terminal 201 determines whether or not image data similar to the second image data after switching exists in the image table 220. In a case of determining that the similar image data exists, the first information processing terminal 201 transmits an annotation display control message m2 including an image ID of the similar image data to the second information processing terminal 202.

Here, a case is assumed where image data having an image ID "xxx" is searched as image data similar to image data 1300 after switching. In this case, the annotation display control message m2 including the image ID "xxx" is transmitted to the second information processing terminal 202.

In a case of receiving the annotation display control message m2, the second information processing terminal 202 refers to the annotation table 230 and superimposes and displays an annotation stored in association with the image ID included in the annotation display control message m2 on the second image data after switching.

Here, a case is assumed where annotations 1301 to 1303 are stored in the annotation table 230 in association with the image ID "xxx" included in the annotation display control message m2. Each of the annotations 1301 to 1303 indicates a handwritten stroke. In this case, the annotations 1301 to 1303 are superimposed and displayed on the image data 1300 after switching.

As a result, when the image data is switched, it is possible to redisplay the annotations 1301 to 1303 that have been added in the past to the image data 1300 (image data having image ID "xxx" similar to image data 1300) after switching.

(Annotation Display Processing Procedure of First Information Processing Terminal 201)

Next, an annotation display processing procedure of the first information processing terminal 201 according to the second embodiment will be described. Here, a case is assumed where transmission of video data from the first information processing terminal 201 to the second information processing terminal 202 is started.

Figure 14:
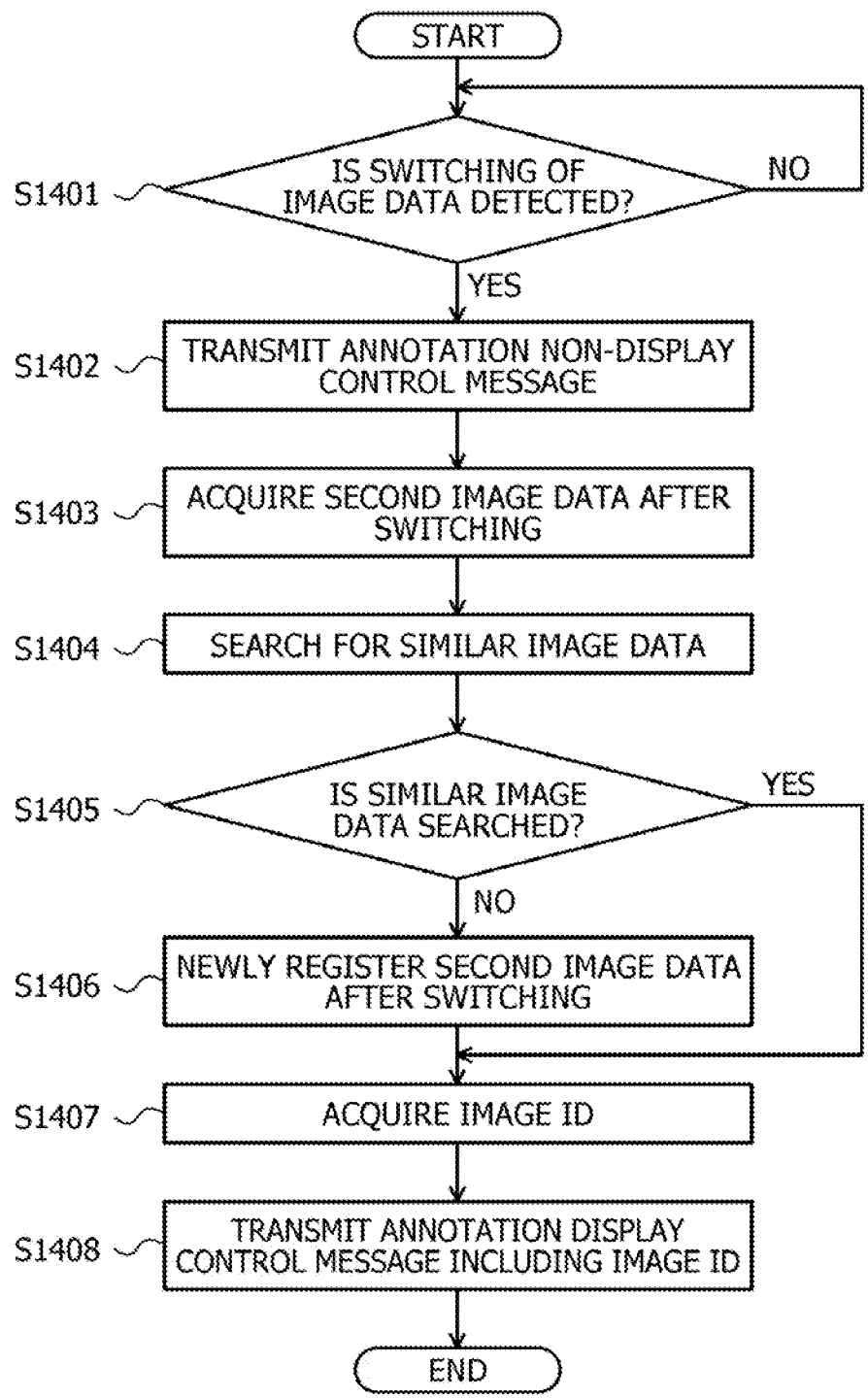
FIG. 14 is a flowchart illustrating an example of an annotation display processing procedure of the first information processing terminal 201 according to the second embodiment.

FIG. 14 is a flowchart illustrating an example of an annotation display processing procedure of the first information processing terminal 201 according to the second embodiment. In the flowchart in FIG. 14, first, the first information processing terminal 201 determines whether or not switching of displayed image data PD is detected (step S1401).

Here, the first information processing terminal 201 waits for the detection of the switching of the displayed image data PD (step S1401: No). Then, in a case where the switching of the displayed image data PD is detected (step S1401: Yes), the first information processing terminal 201 transmits an annotation non-display control message to the second information processing terminal 202 (step S1402).

Next, the first information processing terminal 201 acquires second image data PD after switching (step S1403). Then, the first information processing terminal 201 searches the image table 220 for image data similar to the acquired second image data PD (step S1404).

Next, the first information processing terminal 201 determines whether or not the similar image data is searched (step S1405). Here, in a case where the similar image data is searched (step S1405: Yes), the first information processing terminal 201 proceeds to step S1407 and acquires an image ID of the searched similar image data (step S1407).

On the other hand, in a case where the similar image data is not searched (step S1405: No), the first information processing terminal 201 newly registers the second image data PD after switching in the image table 220 (step S1406). At this time, the first information processing terminal 201 assigns an image ID to the second image data PD after switching.

Next, the first information processing terminal 201 acquires the image ID of the second image data PD after switching (step S1407). Then, the first information processing terminal 201 transmits the annotation display control message including the acquired image ID to the second information processing terminal 202 (step S1408) and ends the series of processing according to this flowchart.

As a result, the annotation non-display control message may be transmitted to the second information processing terminal 202 in response to the switching of the displayed image data PD. Furthermore, in a case where the image data similar to the second image data PD after switching is searched from the image table 220, the annotation display control message including the image ID of the similar image data may be transmitted to the second information processing terminal 202.

(Annotation Display Processing Procedure of Second Information Processing Terminal 202)

Next, an annotation display processing procedure of the second information processing terminal 202 according to the second embodiment will be described. Here, a case is assumed where transmission of video data from the first information processing terminal 201 to the second information processing terminal 202 is started.

Figure 15:
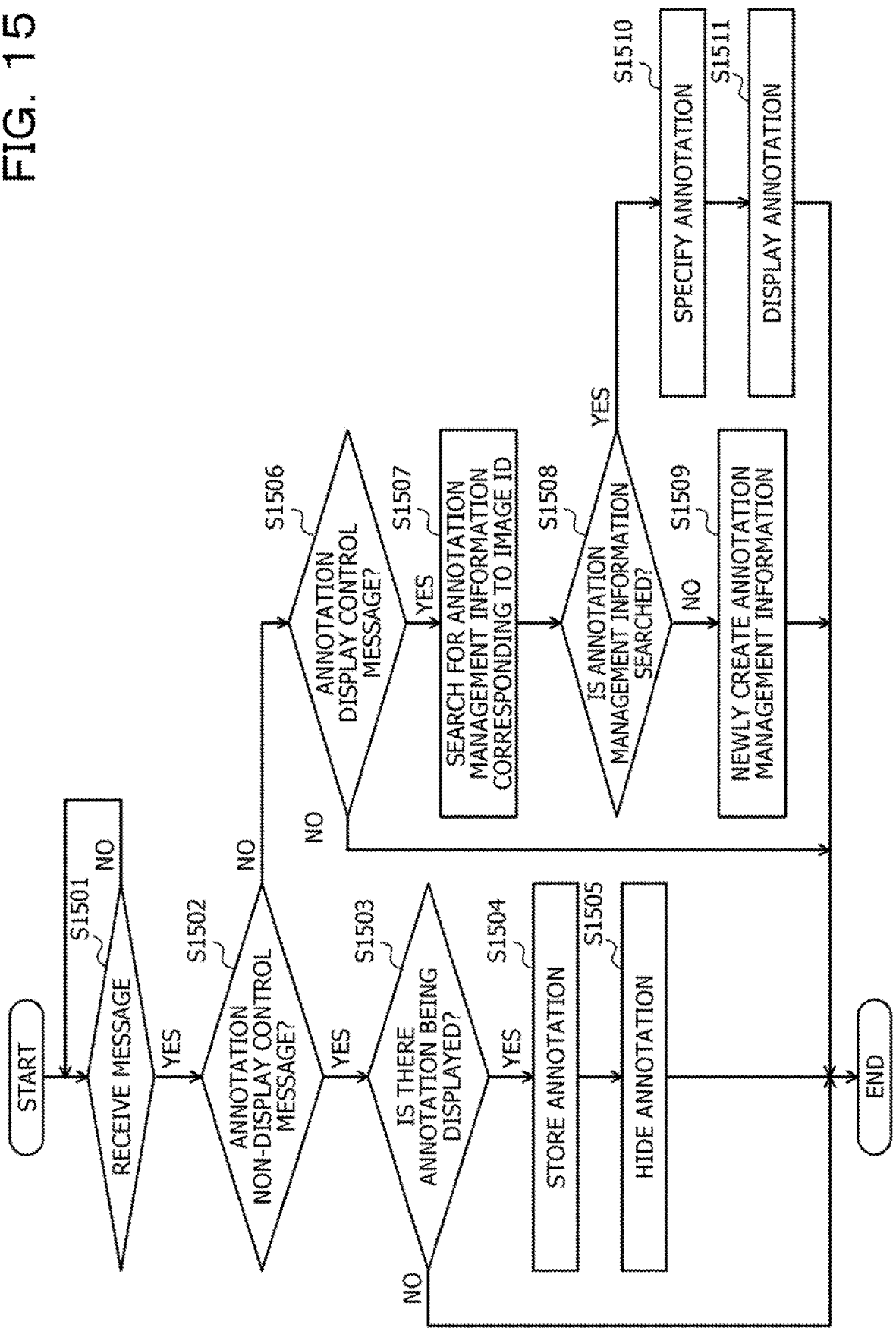
FIG. 15 is a flowchart illustrating an example of an annotation display processing procedure of the second information processing terminal 202 according to the second embodiment.

FIG. 15 is a flowchart illustrating an example of the annotation display processing procedure of the second information processing terminal 202 according to the second embodiment. In the flowchart in FIG. 15, first, the second information processing terminal 202 determines whether or not a message is received from the first information processing terminal 201 (step S1501).

Here, the second information processing terminal 202 waits for reception of the message from the first information processing terminal 201 (step S1501: No). Then, in a case of receiving the message from the first information processing terminal 201 (step S1501: Yes), the second information processing terminal 202 determines whether or not the received message is an annotation non-display control message (step S1502).

Here, in a case of the annotation non-display control message (step S1502: Yes), the second information processing terminal 202 determines whether or not there is an annotation superimposed and being displayed on image data displayed on the display 306 of its own terminal (step S1503).

Here, in a case where there is no annotation being displayed (step S1503: No), the second information processing terminal 202 ends the series of processing according to this flowchart.

On the other hand, in a case where there is an annotation being displayed (step S1503: Yes), the second information processing terminal 202 stores the annotation being displayed in the annotation table 230 in association with the first image data PD before switching (step S1504). Then, the first information processing terminal 201 hides the annotation being displayed (step S1505) and ends the series of processing according to this flowchart.

Furthermore, in step S1502, in a case where the received message is not the annotation non-display control message (step S1502: No), the second information processing terminal 202 determines whether or not the received message is an annotation display control message (step S1506).

Here, in a case where the received message is not the annotation display control message (step S1506: No), the second information processing terminal 202 ends the series of processing according to this flowchart.

On the other hand, in a case where the received message is an annotation display control message (step S1506: Yes), the second information processing terminal 202 searches for annotation management information corresponding to an image ID included in the received annotation display control message from the annotation table 230 (step S1507). Then, the second information processing terminal 202 determines whether or not the annotation management information is searched (step S1508).

Here, in a case where the annotation management information is not searched (step S1508: No), the second information processing terminal 202 newly creates annotation management information corresponding to the image ID included in the annotation display control message in the annotation table 230 (step S1509) and ends the series of processing according to this flowchart.

On the other hand, in a case where the annotation management information is searched (step S1508: Yes), the second information processing terminal 202 refers to the searched annotation management information and specifies an annotation stored in association with the image ID included in the annotation display control message (step S1510). Then, the first information processing terminal 201 superimposes and displays the specified annotation on the image data being displayed on the display 306 of its own terminal (second image data PD after switching) (step S1511), and ends the series of processing according to this flowchart.

As a result, the annotation being displayed may be hidden in response to the annotation non-display control message. Furthermore, it is possible to superimpose and display, on the image data being displayed (second image data PD after switching), an annotation added to the image data in the past, in response to the annotation display control message.

As described above, according to the display system 200 according to the second embodiment, when image data is displayed, a transmission-side terminal (first information processing terminal 201) and a reception-side terminal (second information processing terminal 202) may redisplay the annotation, which has been added to the image data in the past, in cooperation with each other.

Third Embodiment

Next, an annotation display method according to a third embodiment will be described. In the third embodiment, a case will be described where a plurality of second information processing terminals 202 displays the same annotation by sharing the annotation using the information management server 203 illustrated in FIG. 2. Note that illustration and description of a part similar to the part described in the first and second embodiments are omitted.

Here, there is a case where the plurality of second information processing terminals 202 is referred to as "second information processing terminals 202-1 to 202-n" (n: natural number equal to or more than two). Furthermore, it is assumed that an annotation table 230 is included in the information management server 203.

Figure 16:
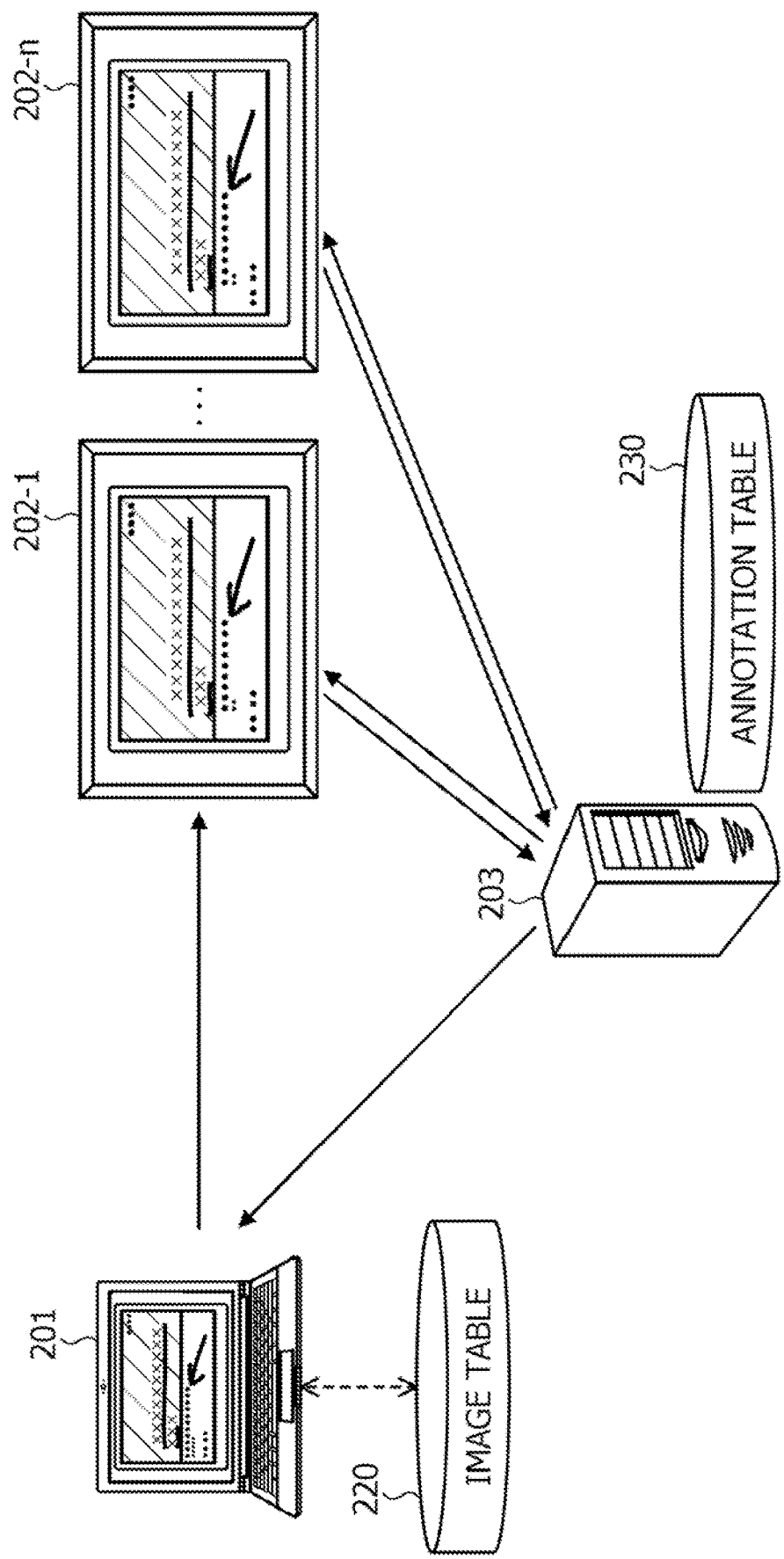
FIG. 16 is an explanatory diagram illustrating an operation example of a display system 200 according to a third embodiment.

FIG. 16 is an explanatory diagram illustrating an operation example of a display system 200 according to the third embodiment. In FIG. 16, a first information processing terminal 201 transmits an annotation non-display control message to the second information processing terminals 202-1 to 202-n in response to detection of switching of displayed image data PD.

In a case of receiving the annotation non-display control message, each of the second information processing terminals 202-1 to 202-n determines whether or not an annotation is added to first image data before switching. Specifically, for example, each of the second information processing terminals 202-1 to 202-n determines whether or not there is an annotation superimposed and being displayed on image data displayed on the display 306 of its own terminal.

In a case of determining that the annotation is added, each of the second information processing terminals 202-1 to 202-n hides the annotation. Furthermore, each of the second information processing terminals 202-1 to 202-n transmits the annotation to the information management server 203 in association with an image ID of first image data before switching.

The information management server 203 stores the image ID and the annotation acquired from each of the second information processing terminals 202-1 to 202-n in an annotation table 230 in association with each other. However, the information management server 203 stores, for example, only an annotation having the latest update time from among the annotations acquired from the second information processing terminals 202-1 to 202-n.

Furthermore, each of the second information processing terminals 202-1 to 202-n may transmit the created or updated annotation to the information management server 203 each time the annotation is created or updated. In this case, when acquiring the created or updated annotation, the information management server 203 transmits the annotation to another second information processing terminal 202.

When receiving the created or updated annotation, the another second information processing terminal 202 superimposes and displays the received annotation on image data instead of the annotation being displayed. As a result, the second information processing terminals 202-1 to 202-n may display the same annotation.

The first information processing terminal 201 determines whether or not image data similar to the second image data after switching exists in the image table 220. In a case of determining that the similar image data exists, the first information processing terminal 201 transmits an annotation display control message including an image ID of the similar image data to the second information processing terminals 202-1 to 202-n.

In a case of receiving the annotation display control message, each of the second information processing terminals 202-1 to 202-n acquires an annotation stored in association with the image ID included in the annotation display control message from the information management server 203. Specifically, for example, each of the second information processing terminals 202-1 to 202-n transmits the image ID included in the annotation display control message to the information management server 203.

When receiving the image ID, the information management server 203 refers to the annotation table 230 and specifies an annotation stored in association with the received image ID. Then, the information management server 203 transmits the specified annotation to each of the second information processing terminals 202-1 to 202-n. Each of the second information processing terminals 202-1 to 202-n superimposes and displays the annotation acquired from the information management server 203 on the second image data after switching.

As described above, according to the display system 200 according to the third embodiment, the second information processing terminals 202-1 to 202-n may display the same annotation by sharing the annotation using the information management server 203.

Note that, in a case where it is determined that the image data similar to the second image data after switching exists, the first information processing terminal 201 may transmit the image ID of the similar image data to the information management server 203. In this case, the first information processing terminal 201 acquires an annotation stored in association with the transmitted image ID from the information management server 203. Then, the first information processing terminal 201 superimposes and displays the annotation acquired from the information management server 203 on the second image data after switching. As a result, the first information processing terminal 201 may also display the same annotation with the second information processing terminals 202-1 to 202-n.

Fourth Embodiment

Next, an annotation display method according to a fourth embodiment will be described. In the fourth embodiment, a case will be described where when the image ID of image data PD after switching is transmitted from a first information processing terminal 201 to a second information processing terminal 202, image data corresponding to the image ID is also transmitted. Note that illustration and description of a part similar to the part described in the first to third embodiments are omitted.

Figure 17:
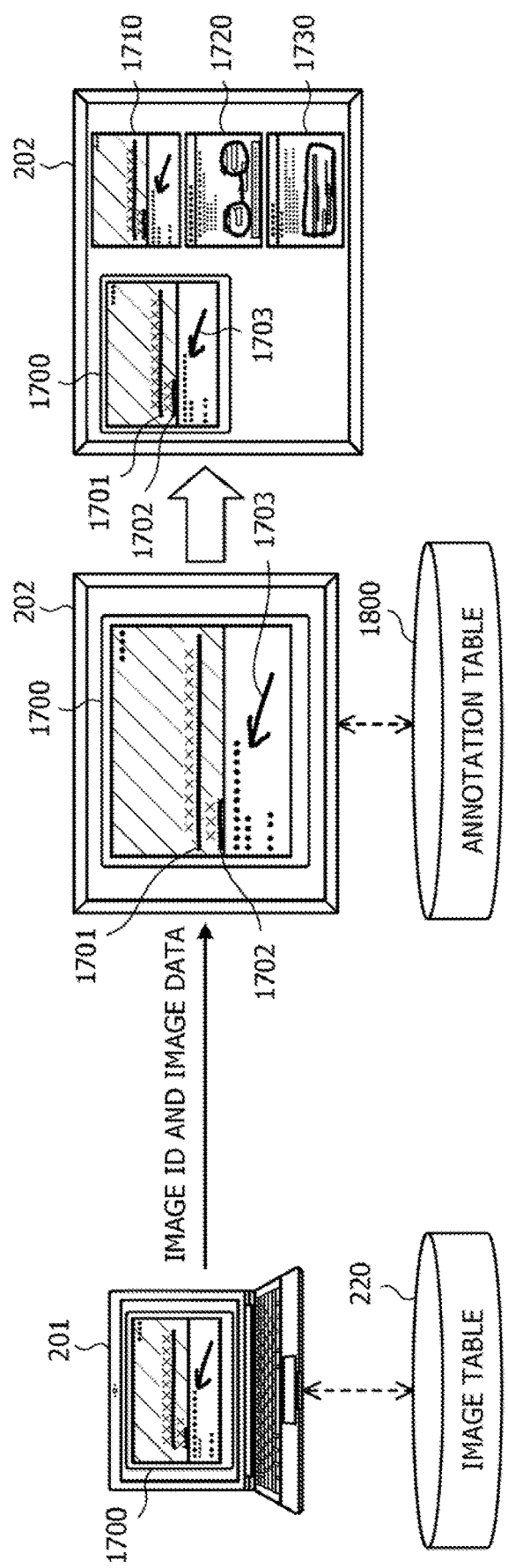
FIG. 17 is an explanatory diagram illustrating an operation example of a display system 200 according to a fourth embodiment.

FIG. 17 is an explanatory diagram illustrating an operation example of a display system 200 according to the fourth embodiment. In FIG. 17, the first information processing terminal 201 transmits an annotation non-display control message to the second information processing terminal 202 in response to detection of switching of displayed image data PD.

In a case of receiving the annotation non-display control message, the second information processing terminal 202 determines whether or not an annotation is added to first image data before switching. Specifically, for example, the second information processing terminal 202 determines whether or not there is an annotation superimposed and being displayed on image data displayed on the display 306 of its own terminal.

Figure 18:
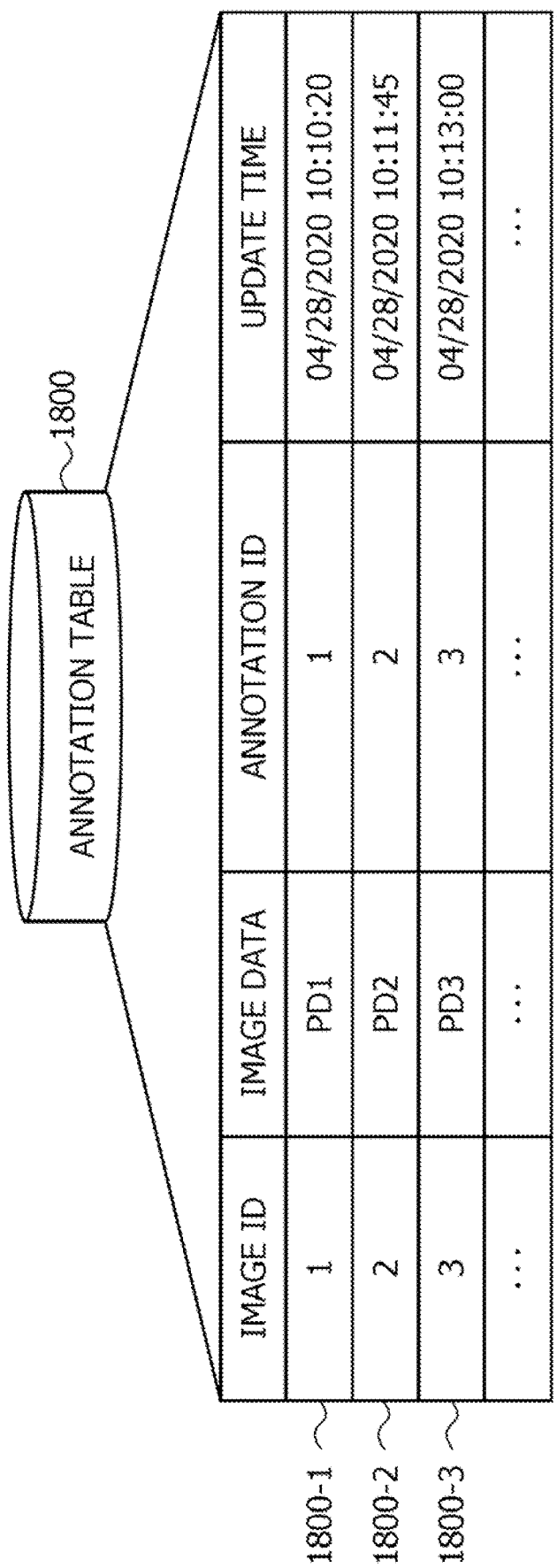
FIG. 18 is an explanatory diagram illustrating an example of content stored in an annotation table 1800.

In a case of determining that the annotation is added, the second information processing terminal 202 hides the annotation and stores the annotation in an annotation table 1800 illustrated in FIG. 18 in association with an image ID of the first image data before switching.

The first information processing terminal 201 determines whether or not image data similar to the second image data after switching exists in the image table 220. In a case where it is determined that the similar image data exists, the first information processing terminal 201 transmits an annotation display control message including an image ID of the similar image data and the similar image data (or second image data after switching) to the second information processing terminal 202.

In a case of receiving the annotation display control message, the second information processing terminal 202 refers to the annotation table 1800 and superimposes and displays an annotation stored in association with the image ID included in the annotation display control message on the second image data after switching.

Here, a case is assumed where annotations 1701 to 1703 are superimposed and displayed on image data 1700 after switching.

Furthermore, the second information processing terminal 202 stores image data included in the annotation display control message in association with the image ID included in the annotation display control message in the annotation table 1800. Here, content stored in the annotation table 1800 will be described.

FIG. 18 is an explanatory diagram illustrating an example of the content stored in the annotation table 1800. In FIG. 18, the annotation table 1800 includes fields of an image ID, image data, an annotation ID, and an update time and sets information to each field so as to store annotation management information (for example, annotation management information 1800-1 to 1800-3) as records.

Here, the image ID indicates an image ID of image data to which an annotation is added. The image data is image data to which an annotation is added. The annotation ID is an identifier used to uniquely identify an annotation. The update time indicates a date and time when the annotation is created or updated.

For example, the annotation management information 1800-1 indicates an image ID "1", image data PD1, an annotation ID "1", and an update time "2020/04/28 10:10:20". Note that the annotation table 1800 includes, for example, the stroke table 600 illustrated in FIG. 6.

As a result, for example, in a case where an instruction to create a digital sticky note is received by an operation input of a user using the input device 307 of its own terminal, the second information processing terminal 202 may refer to the annotation table 1800 and create the digital sticky note. The digital sticky note is information displayed by superimposing an annotation on image data.

For example, the second information processing terminal 202 may refer to the annotation table 1800 and create a digital sticky note 1710 in which the annotation having the annotation ID "1" is superimposed and displayed on the image data PD1. Furthermore, the second information processing terminal 202 may refer to the annotation table 1800 and create a digital sticky note 1720 in which an annotation having an annotation ID "2" is superimposed and displayed on image data PD2. Furthermore, the second information processing terminal 202 may refer to the annotation table 1800 and create a digital sticky note 1730 in which the annotation having an annotation ID "3" is superimposed on image data PD3.

Furthermore, for example, the second information processing terminal 202 may display the created digital sticky notes 1710, 1720, and 1730. In the example in FIG. 17, the image data 1700 (including annotations 1701 to 1703)

transmitted from the first information processing terminal 201 and the digital sticky notes 1710, 1720, and 1730 are collectively displayed.

As described above, according to the display system 200 according to the fourth embodiment, the second information processing terminal 202 may create the digital sticky note in which the annotation is superimposed on the corresponding image data. Furthermore, by holding the image data corresponding to the image ID by the side of the second information processing terminal 202, it is possible to create a digital sticky note in which an annotation is superimposed on appropriate image data.

Note that the annotation display method described in the present embodiment may be implemented by executing a prepared program with a computer such as a personal computer or a workstation. This annotation display program is recorded on a computer-readable recording medium such as a hard disk, flexible disk, compact disk read only memory (CD-ROM), digital versatile disc (DVD), or USB memory, and is read from the recording medium by the computer to be executed. Furthermore, the annotation display program may be distributed via a network such as the Internet.

According to one aspect of the present embodiment, an effect is obtained that it is possible to redisplay an annotation added to image data in the past when the image data is displayed.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that the various changes, substitutions, and alterations could be made hereto without departing from the spirit and scope of the invention.

What is claimed is:

1. A non-transitory computer-readable recording medium having stored therein a program that causes a computer to execute a process, the process comprising:
   determining, in response to detection of switching of displayed image data, whether a first annotation is added to first image data which is displayed before the switching;
   storing the first annotation in a storage in association with the first image data in a case where it is determined that the first annotation is added to the first image data;
   determining whether first specific image data exists in the storage, the first specific image data satisfying a condition with respect to second image data which is displayed after the switching; and
   superimposing, in a case where it is determined that the first specific image data exists, a second annotation stored in the storage in association with the first specific image data on the second image data to display the second annotation, the storage stores time information, which indicates a time when each displayed image data is most recently displayed, in association with the each displayed image data; and
   determining, in a case where second specific image data does not exist in the storage when switching to the first image data is detected before the switching to the second image data, whether each image data satisfies the condition with respect to the second image data in order of priority from image data that has a newest time of most recently displayed among data stored in the storage, the second specific image data satisfying the condition with respect to the first image data.

2. The non-transitory computer-readable recording medium according to claim 1, wherein
   the storage stores time information, which indicates a time when each displayed image data is displayed first in association with the each displayed image data, and the process further comprises:
   determining, in a case where second specific image data exists in the storage when switching to the first image data is detected before the switching to the second image data, whether each image data satisfies the condition with respect to the second image data in order of priority from image data that has a closer time of displayed first to the second specific image data among data stored in the storage, the second specific image data satisfying the condition with respect to the first image data.

3. The non-transitory computer-readable recording medium according to claim 1, the process further comprising:
   hiding the first annotation in a case where it is determined that the first annotation is added to the first image data.

4. The non-transitory computer-readable recording medium according to claim 1, wherein the first image data is transmitted from a first device to a second device and is displayed on the second device.

5. The non-transitory computer-readable recording medium according to claim 1, the process further comprising:
   calculating a similarity between the second image data and each image data stored in the storage; and
   determining that the first specific image data exists in a case where the calculated similarity between the second image data and any image data stored in the storage is equal to or more than a predetermined threshold.

6. An annotation display method, comprising:
   transmitting, by a first device, image data displayed on the first device to a second device;
   transmitting, by the first device, a non-display control message to the second device in response to detection of switching of displayed image data;
   determining, by the first device, whether first specific image data exists in a first storage, the first specific image data satisfying a condition with respect to second image data which is displayed after the switching;
   transmitting by the first device, in a case where it is determined that the first specific image data exists, a display control message that includes a first identifier used to identify the first specific image data to the second device;
   displaying the transmitted image data by a second device;
   determining by the second device, in a case where the non-display control message is received, whether a first annotation is added to the first image data;
   hiding, by the second device, the first annotation in a case where it is determined that the first annotation is added to the first image data;
   storing by the second device, in a case where it is determined that the first annotation is added to the first image data, the first annotation in a second storage in association with a second identifier used to identify the first image data; and
   superimposing by the second device, in a case where the display control message is received, a second annotation stored in the second storage in association with the first identifier included in the display control message on the second image data to display the second annotation.

7. The annotation display method according to claim 6, wherein
the display control message further includes the first specific image data, and
the annotation display method further comprises:
storing, by the second device, the first specific image data in the second storage in association with the first identifier in a case where the display control message is received; and
creating, by the second device, image data obtained by superimposing the second annotation stored in the second storage in association with the first identifier on the first specific image data stored in the second storage in association with the first identifier.

8. A terminal, comprising:
a memory; and
a processor coupled to the memory and the processor configured to:
determine, in response to detection of switching of displayed image data, whether a first annotation is added to first image data which is displayed before the switching;
store the first annotation in a storage in association with the first image data in a case where it is determined that the first annotation is added to the first image data;
determine whether first specific image data exists in the storage, the first specific image data satisfying a condition with respect to second image data which is displayed after the switching exists in the storage;
superimpose, in a case where it is determined that the first specific image data exists, a second annotation stored in the storage in association with the first specific image data on the second image data to display the second annotation, the storage stores time information, which indicates a time when each displayed image data is most recently displayed, in association with the each displayed image data; and
determine, in a case where second specific image data does not exist in the storage when switching to the first image data is detected before the switching to the second image data, whether each image data satisfies the condition with respect to the second image data in order of priority from image data that has a newest time of most recently displayed among data stored in the storage, the second specific image data satisfying the condition with respect to the first image data.

* * * * *